Figure 1:
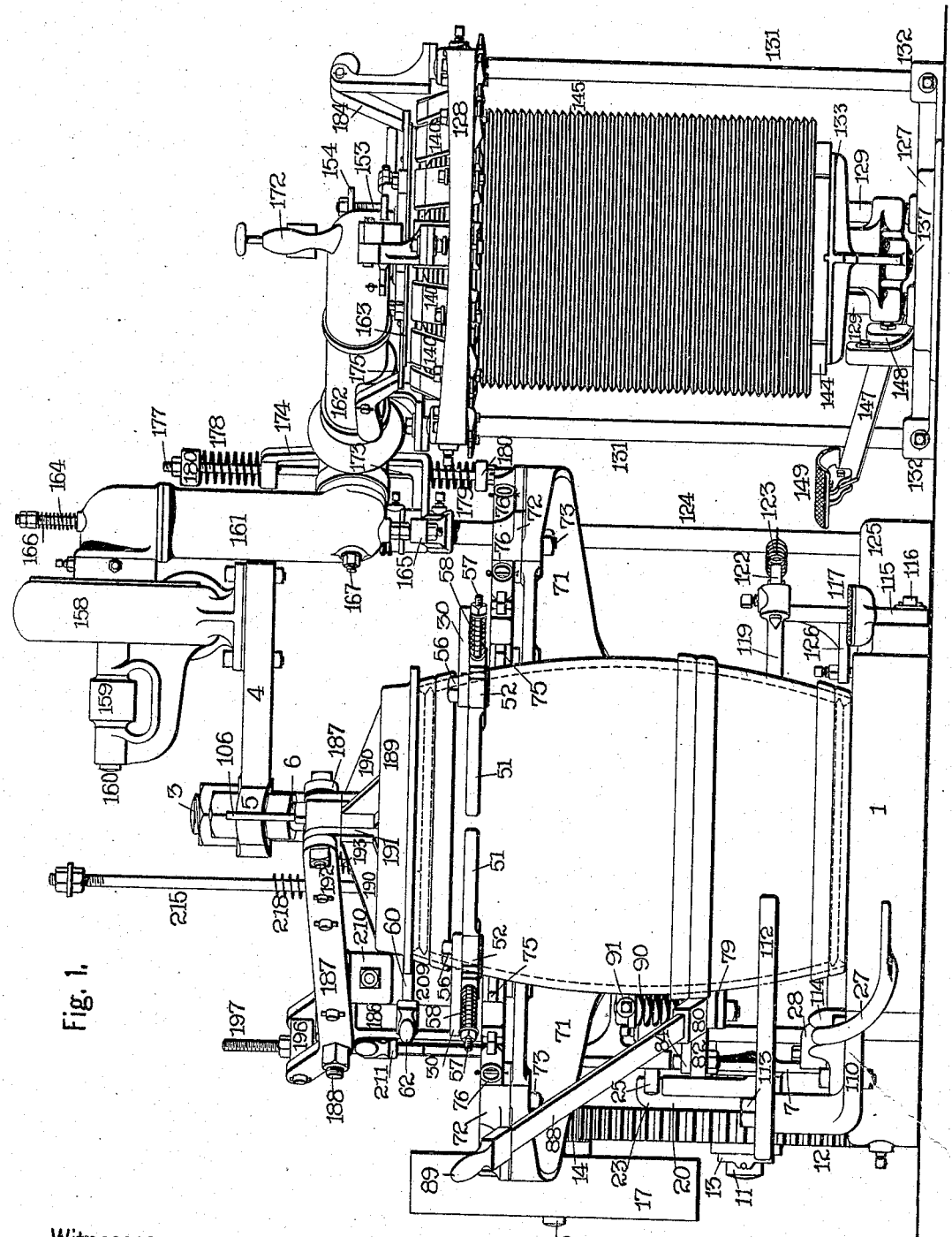

E. F. BEUGLER.
BARREL MAKING MACHINE.
APPLICATION FILED MAY 25, 1905.

941,404.

Patented Nov. 30, 1909.
16 SHEETS—SHEET 3.

Witnesses.
L. M. Sangster.
Geo. A. Neubauer

Edwin F. Beugler, Inventor.
By A. J. Sangster, Attorney.

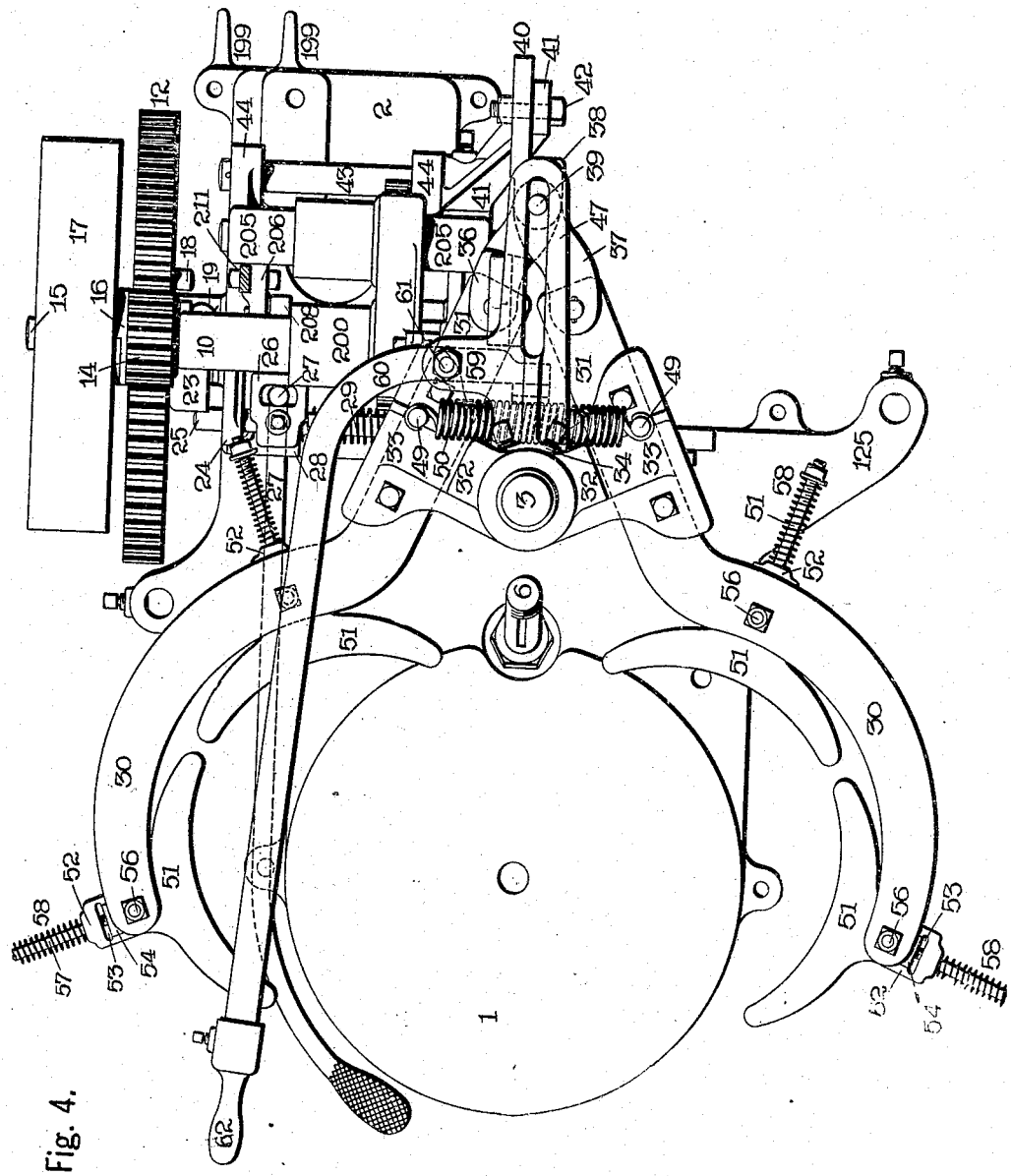

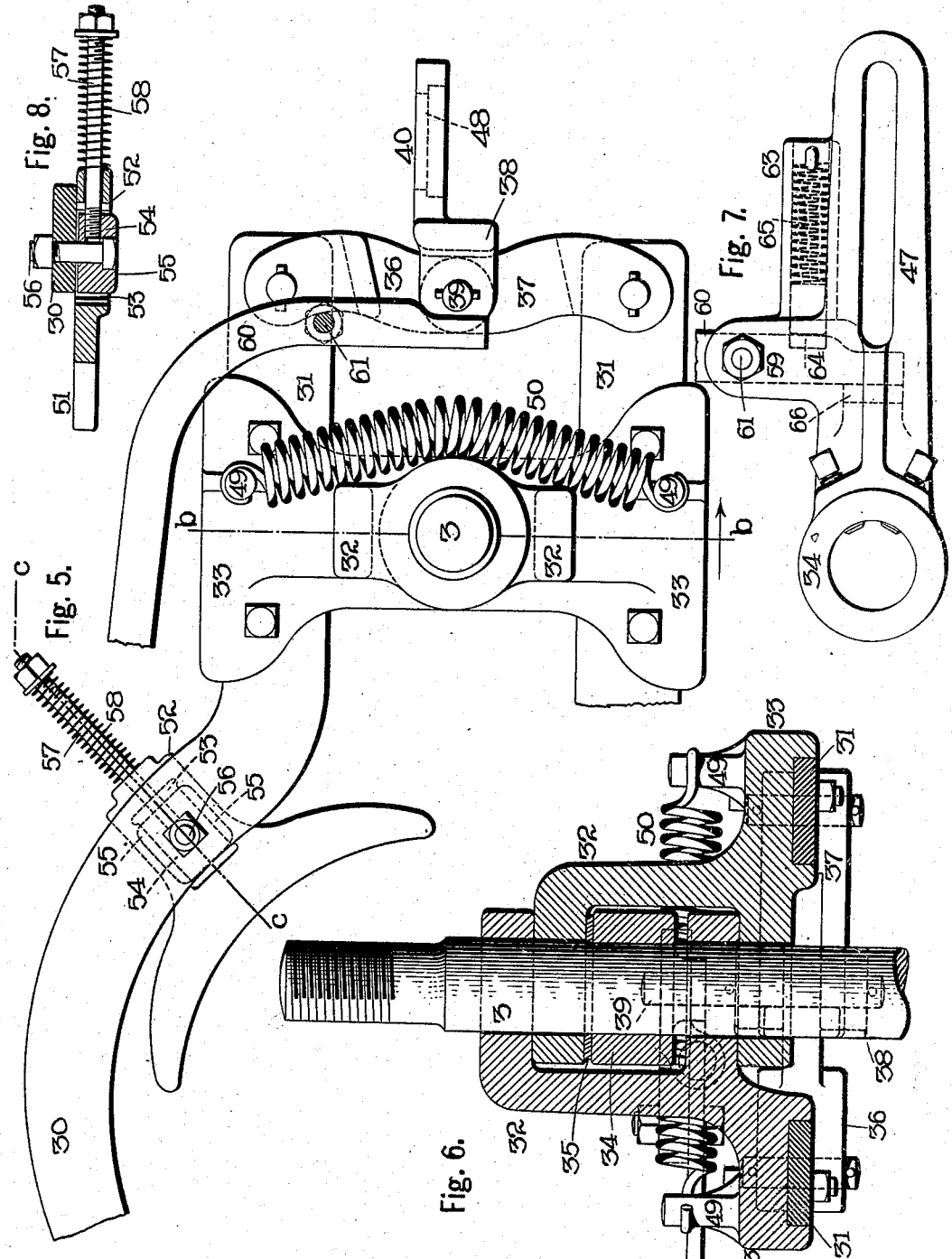

E. F. BEUGLER.
BARREL MAKING MACHINE.
APPLICATION FILED MAY 25, 1905.
941,404.
Patented Nov. 30, 1909.
16 SHEETS—SHEET 6.
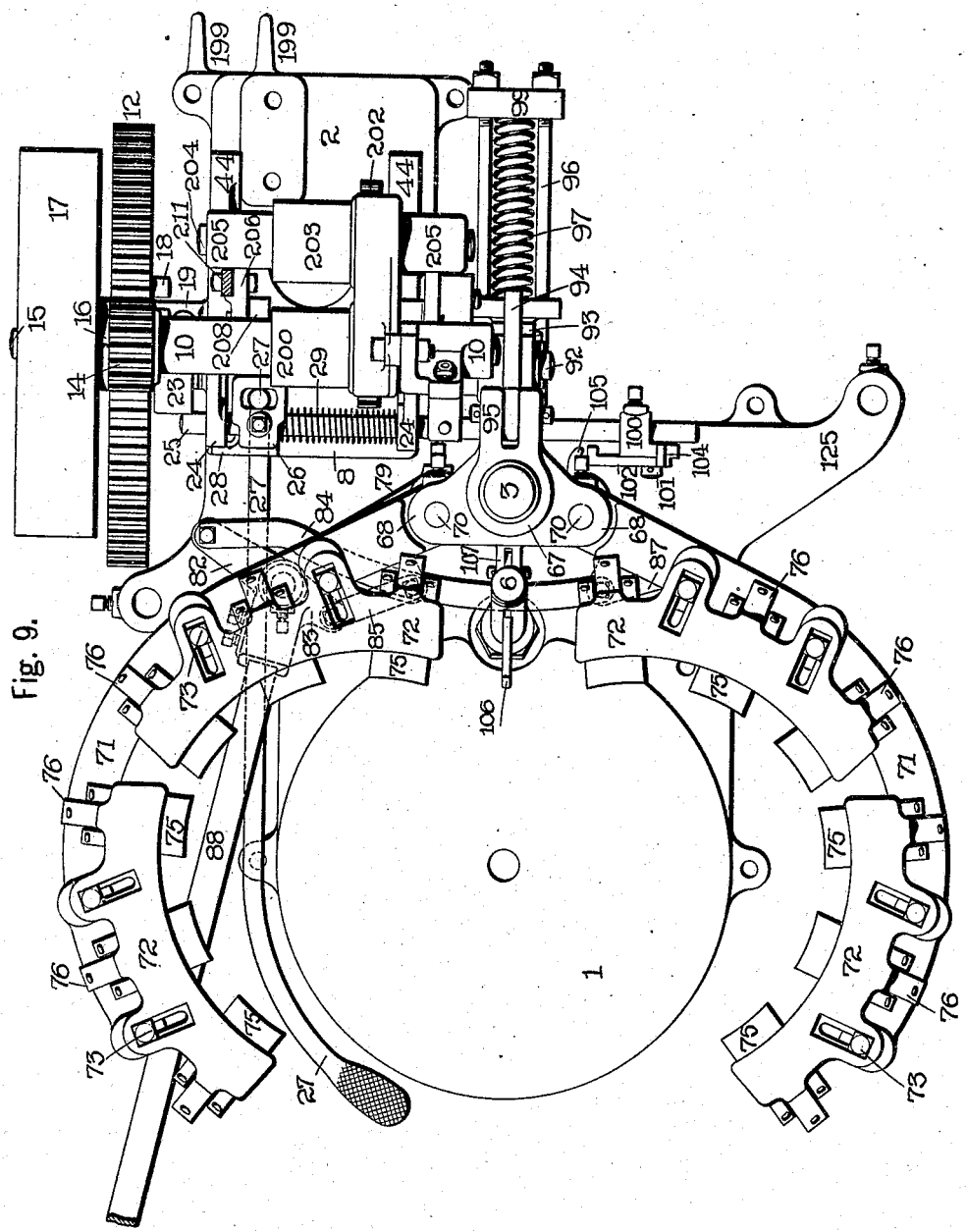
Witnesses.
L. M. Sangster.
Geo. A. Neubauer.
Edwin F. Beugler, Inventor.
By A. J. Sangster, Attorney.

E. F. BEUGLER.
BARREL MAKING MACHINE.
APPLICATION FILED MAY 25, 1905.
941,404.
Patented Nov. 30, 1909.
16 SHEETS—SHEET 7.
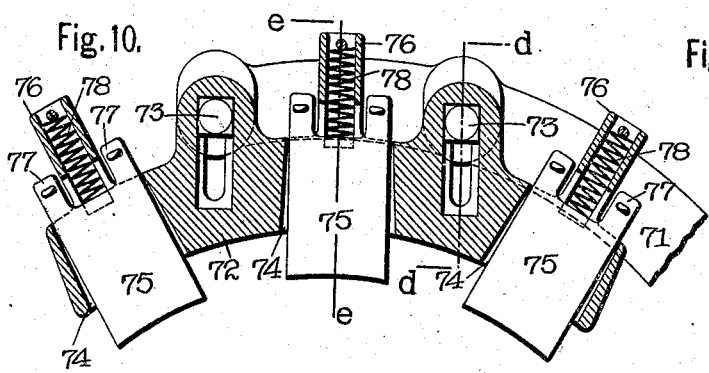
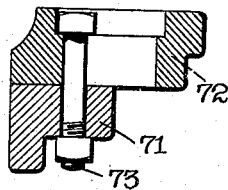
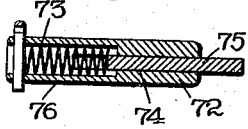
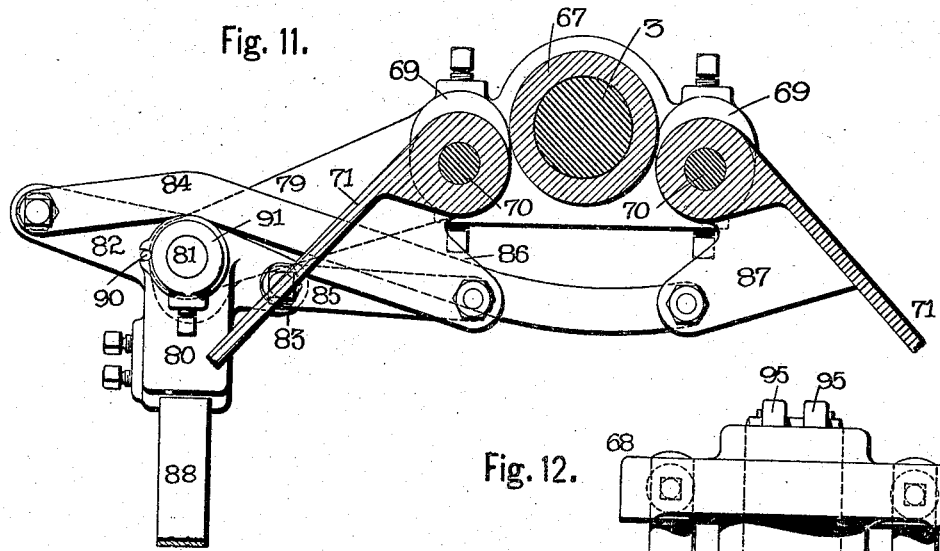
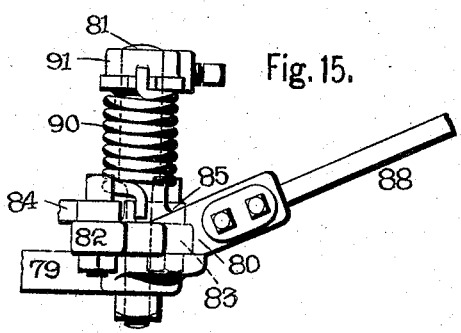
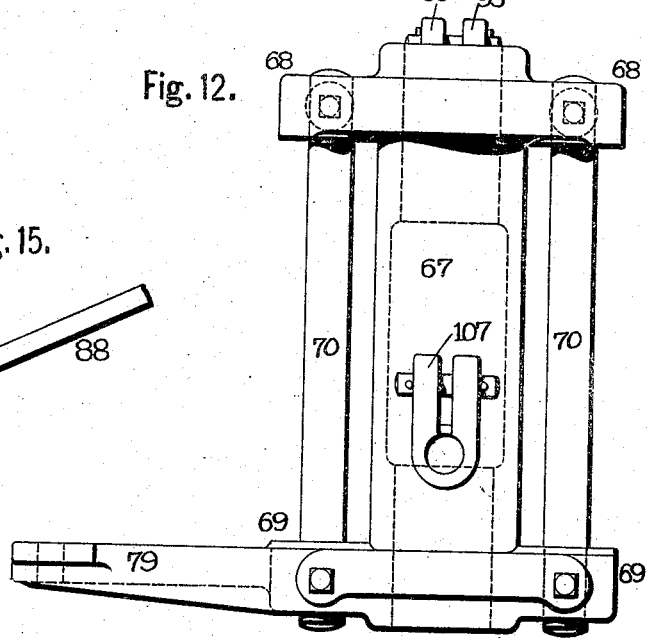
Witnesses.
L. M. Sangster.
Geo. A. Neubauer.
Inventor.
Edwin F. Beugler,
By
A. J. Sangster Attorney.

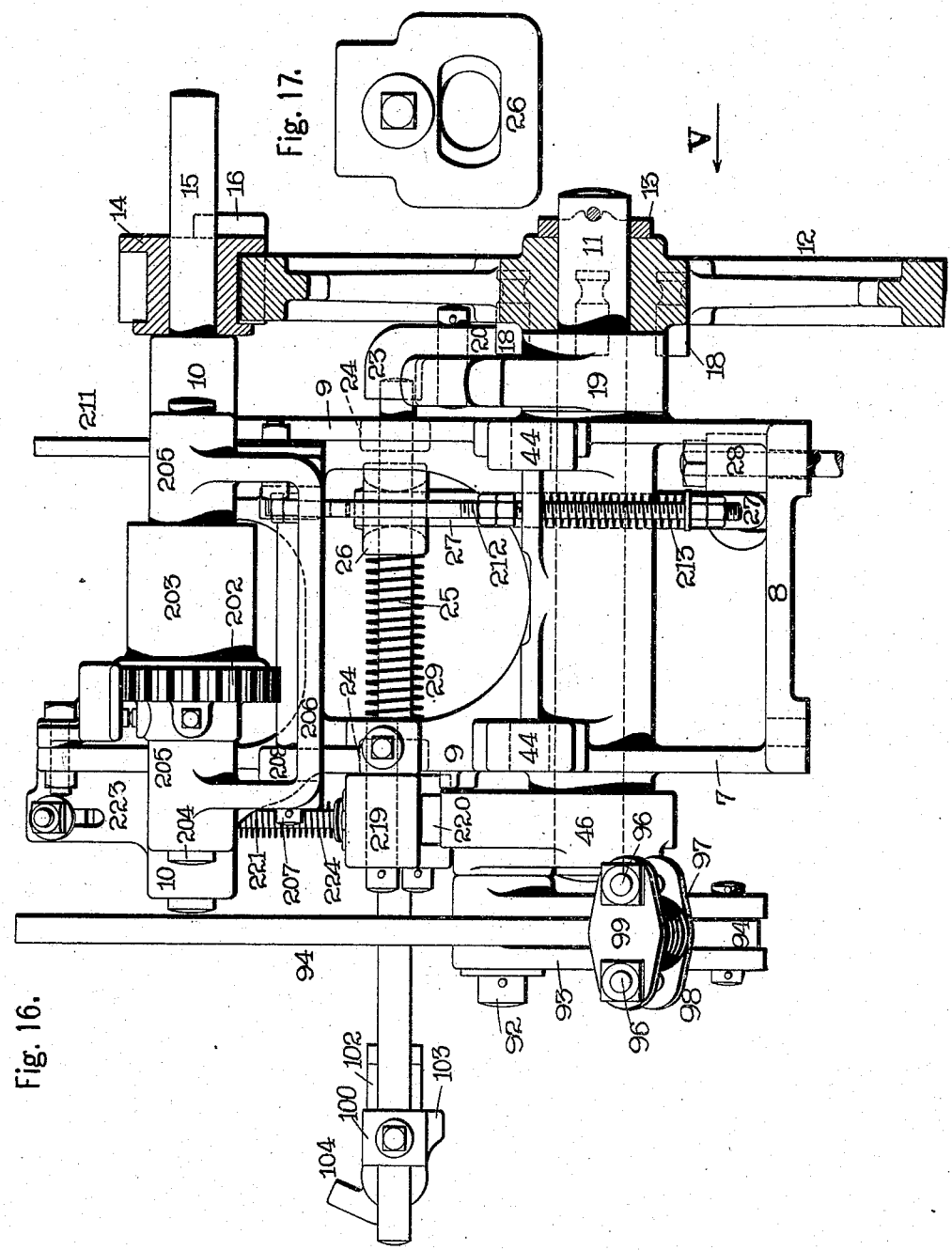

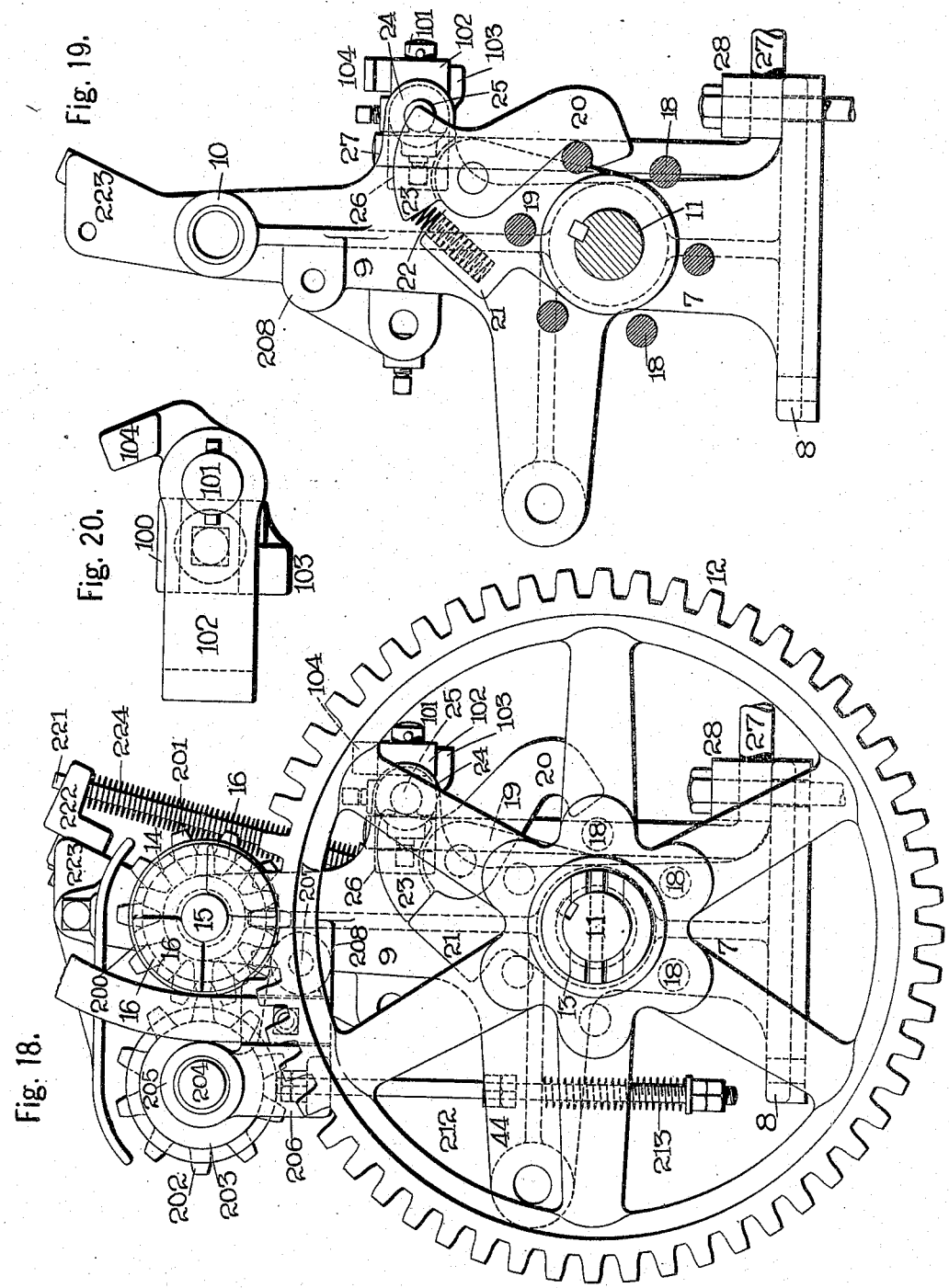

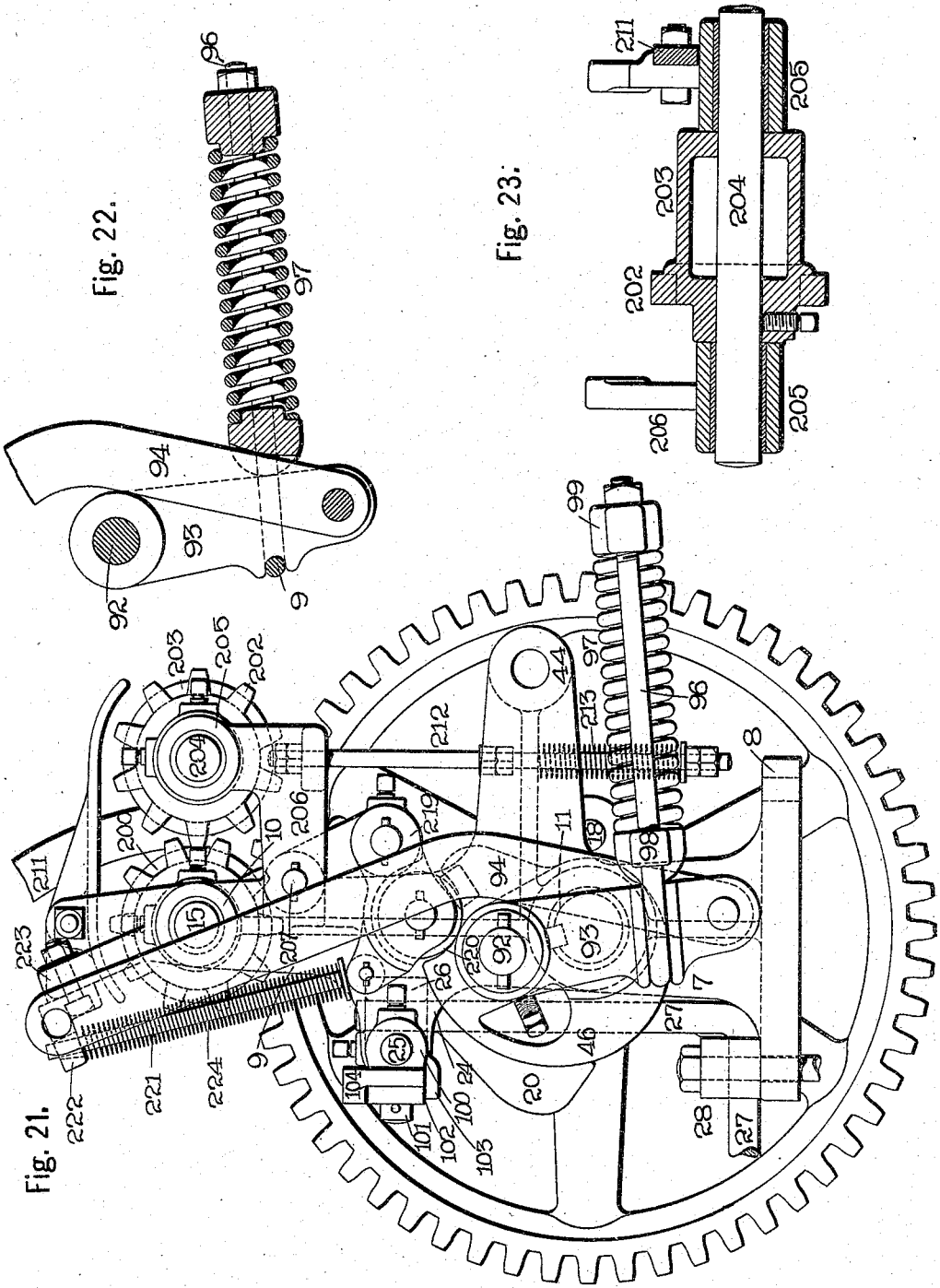

E. F. BEUGLER.
BARREL MAKING MACHINE.
APPLICATION FILED MAY 25, 1905.

941,404.

Patented Nov. 30, 1909.
16 SHEETS—SHEET 11.

Witnesses.

Edwin F. Beugler, Inventor.

By A. J. Sangster, Attorney.

E. F. BEUGLER.
BARREL MAKING MACHINE.
APPLICATION FILED MAY 25 1905.

941,404.

Patented Nov. 30, 1909.
16 SHEETS—SHEET 12.

Witnesses.
L. M. Sangster.
Geo. A. Neubauer.

Edwin F. Beugler, Inventor.
By A. J. Sangster, Attorney.

E. F. BEUGLER.
BARREL MAKING MACHINE.
APPLICATION FILED MAY 25, 1905.
941,404.
Patented Nov. 30, 1909.
16 SHEETS—SHEET 13.
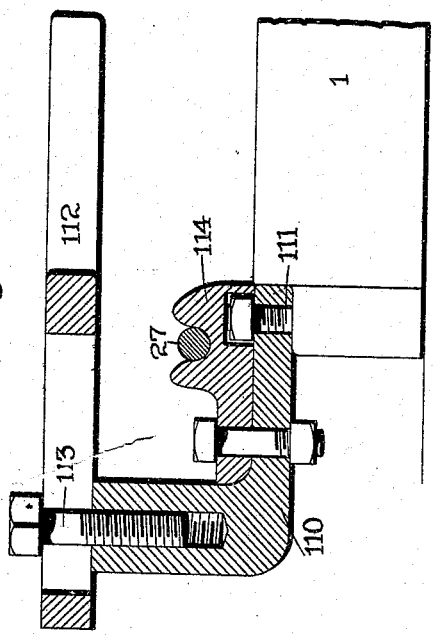
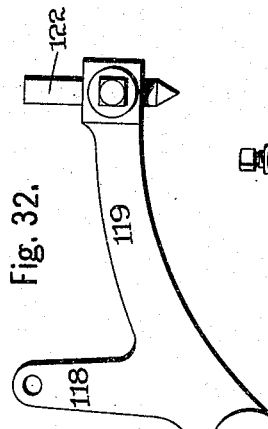
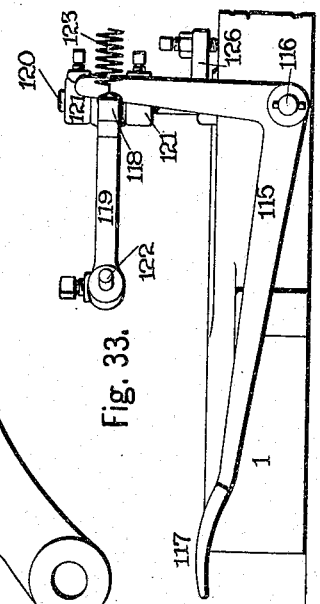
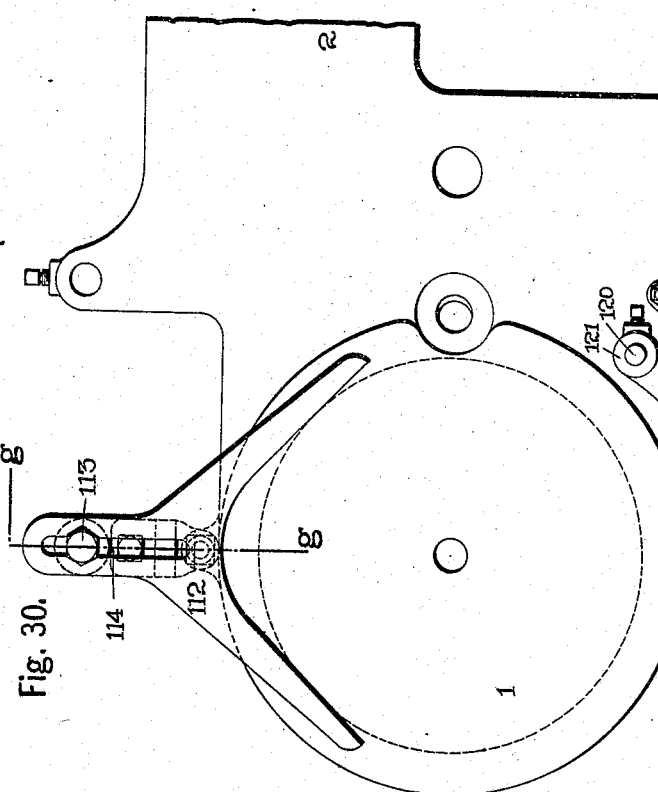
Witnesses.
L. M. Bangeter.
Geo. A. Neubauer.
Inventor.
Edwin F. Beugler,
By A. J. Haugsted, Attorney.

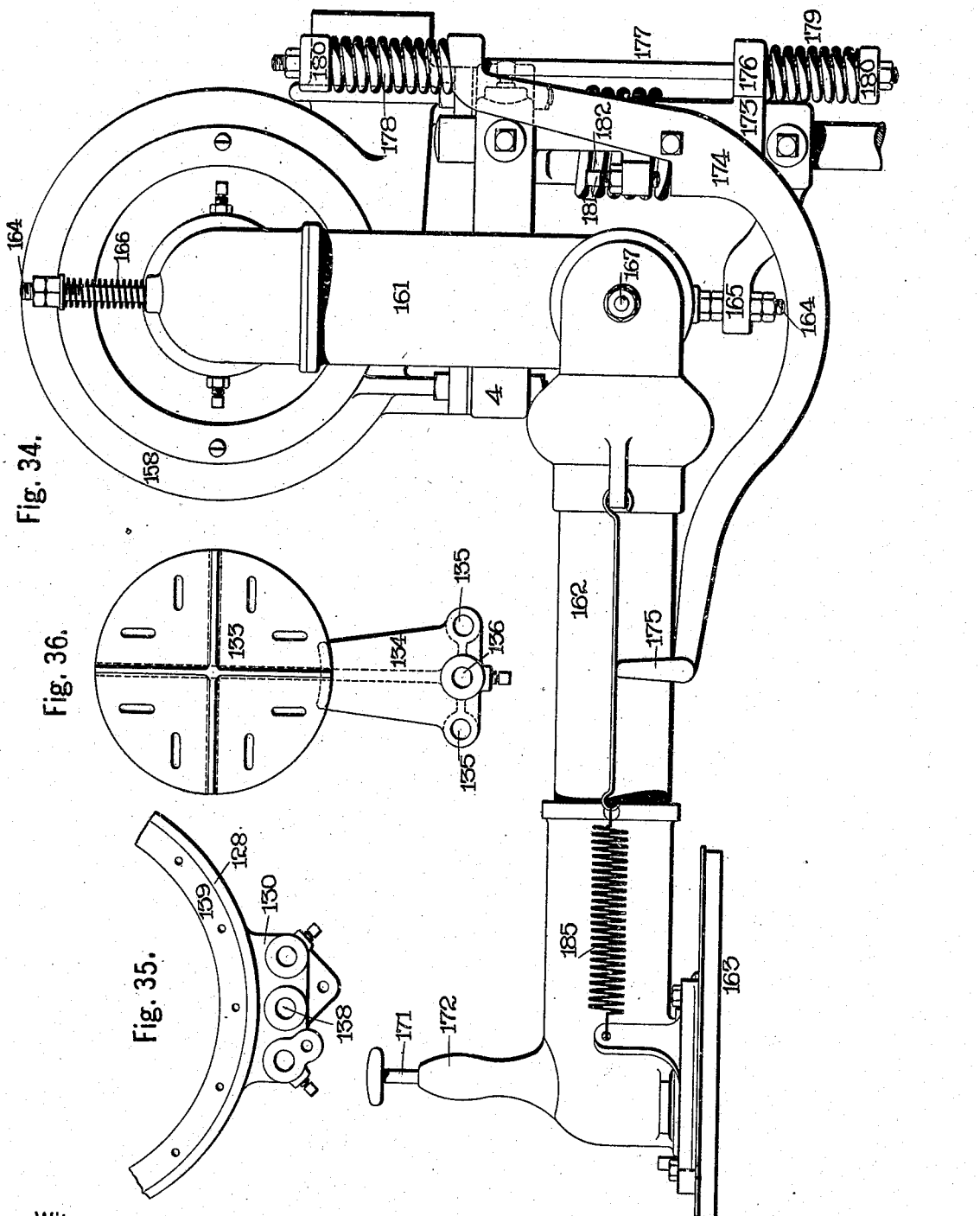

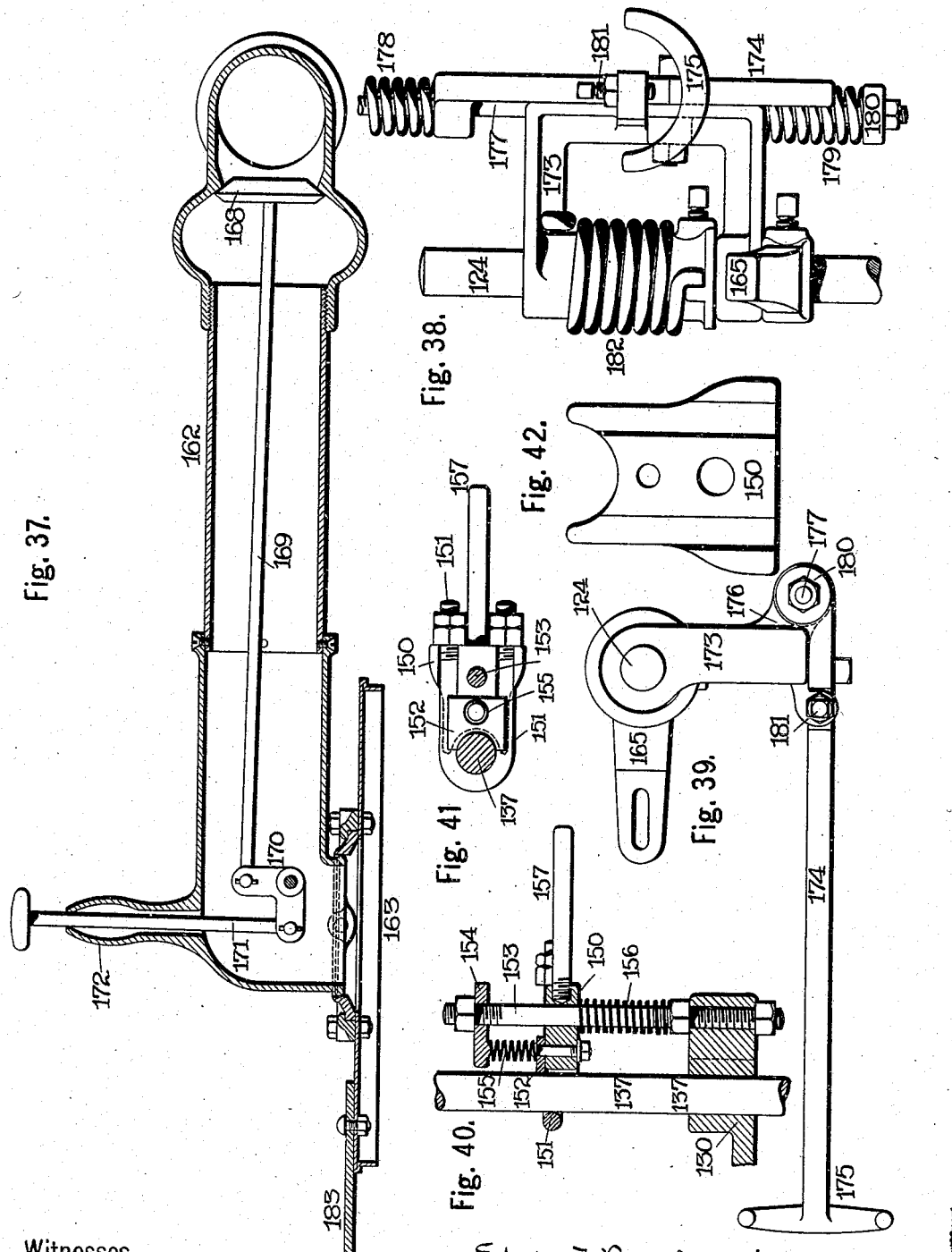

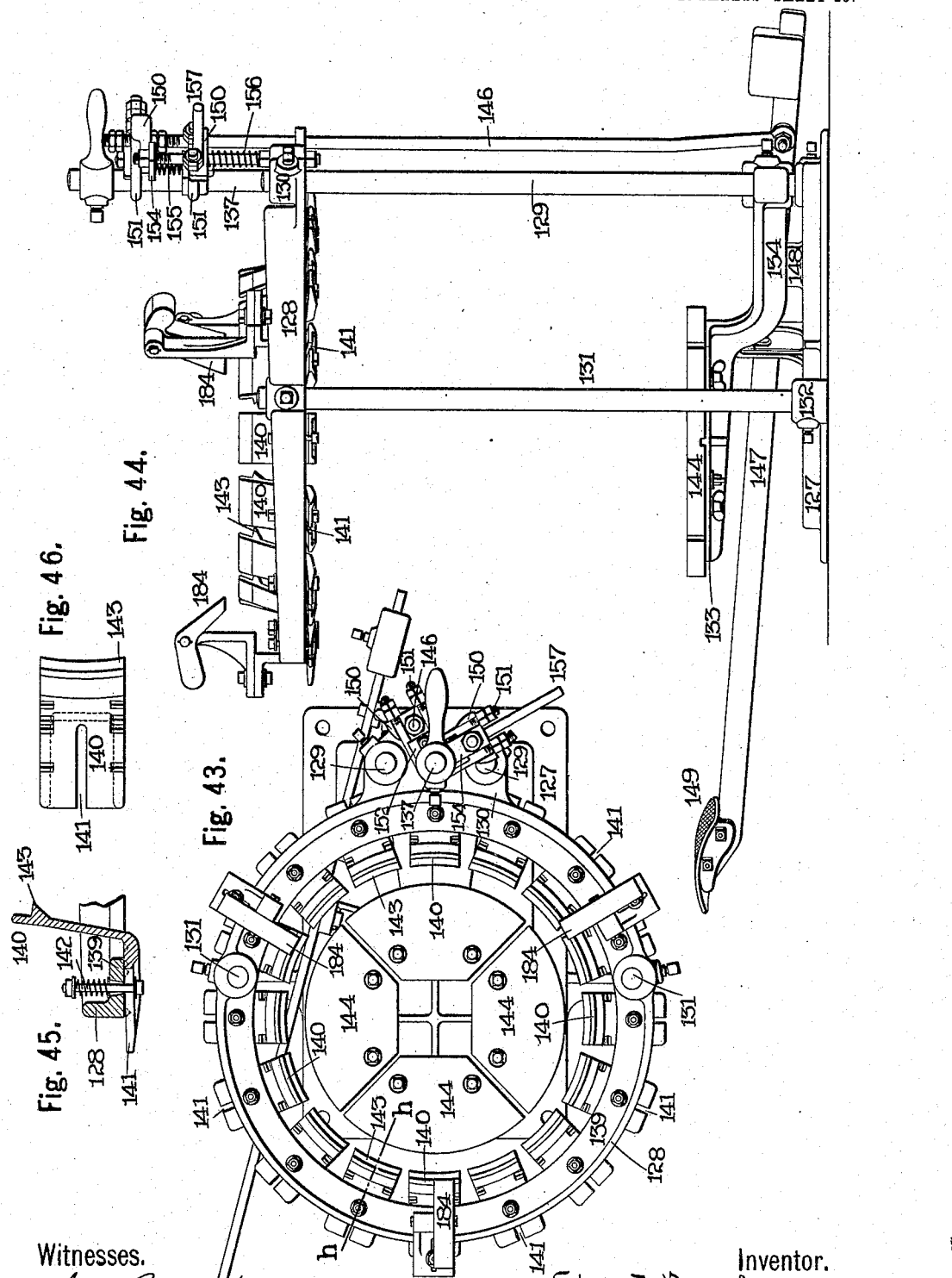

UNITED STATES PATENT OFFICE.

EDWIN F. BEUGLER, OF BUFFALO, NEW YORK, ASSIGNOR TO EDWARD B. HOLMES, OF BUFFALO, NEW YORK.

BARREL-MAKING MACHINE.

941,404.  Specification of Letters Patent.  Patented Nov. 30, 1909.

Application filed May 25, 1905. Serial No. 262,188.

*To all whom it may concern:*

Be it known that I, EDWIN F. BEUGLER, a citizen of the United States, residing at Buffalo, in the county of Erie and State of New York, have invented certain new and useful Improvements in Barrel-Making Machines, of which the following is a specification.

This invention relates to an improved barrel machine for making barrels or the like, in which the various operations of assembling and compressing the staves, depositing and fitting the head in place and driving the hoops thereon are performed by novel mechanisms which are operated by power and manually controlled.

Among the features of the invention are included a pair of compressing arms which have opposed curved parts that completely surround and compress the staves sufficiently to permit the hoops to be fitted thereon, a pair of hoop driving arms for driving the bilge hoops which have opposed curved parts that embrace the barrel and carry hoop drivers and are movable horizontally to clamp or release the barrel and vertically to force the hoops thereon and a novel mechanism for driving the end hoops upon the barrel.

The object of the invention is to construct a machine of this character which is as nearly automatic as possible, all of the various operations being performed by power and controlled by the operator.

The invention however is not to be considered as limited to the mechanism above stated, as their order of operating upon barrels might be changed or varied or some of the mechanism might be altogether omitted without rendering the machine inoperative.

It should be understood that while the above enumerated features are the most important, the invention also consists in certain other mechanisms and details of construction, all of which will be fully and clearly hereinafter described and claimed reference being had to the accompanying drawings, in which,—

Figure 2:
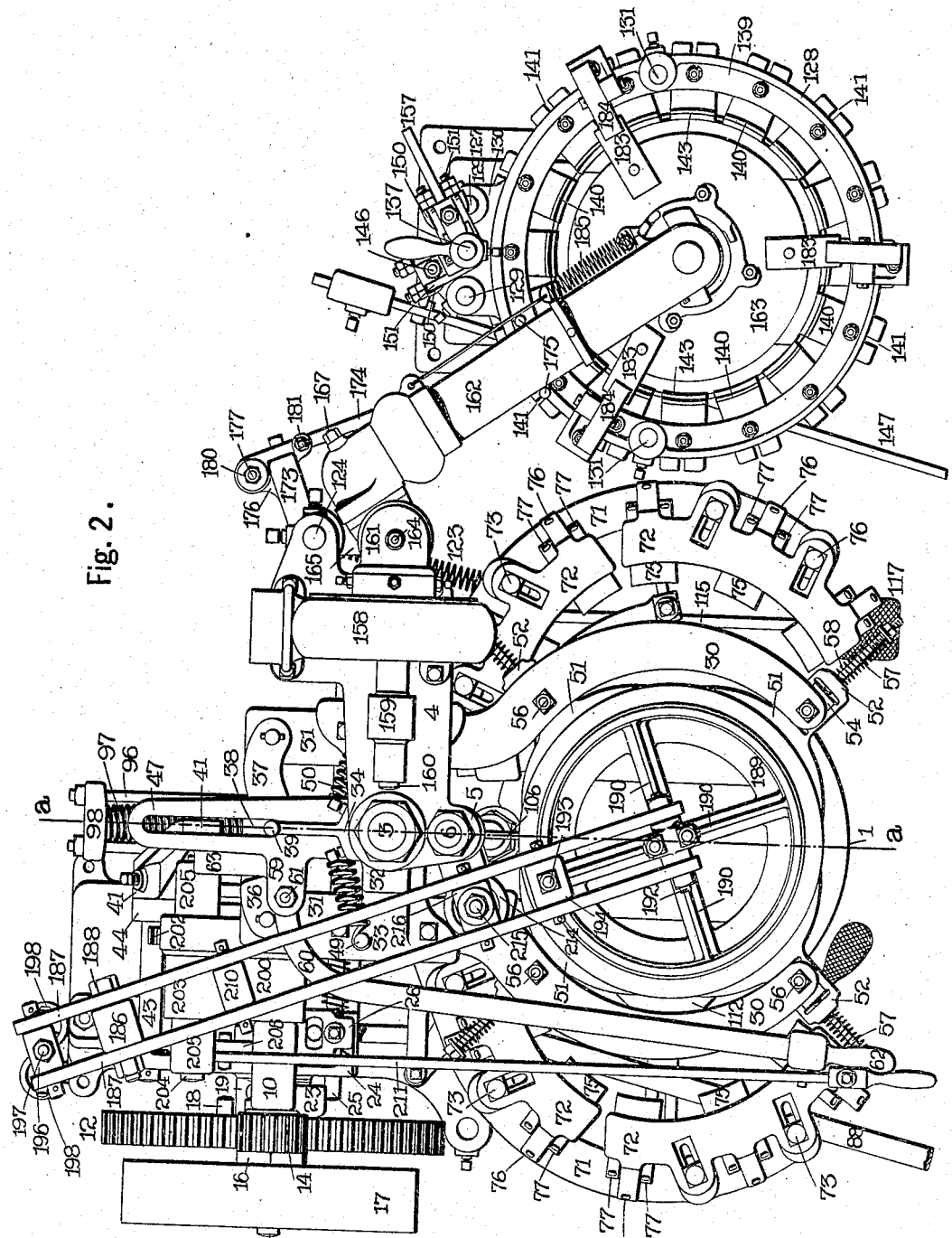
Figure 3:
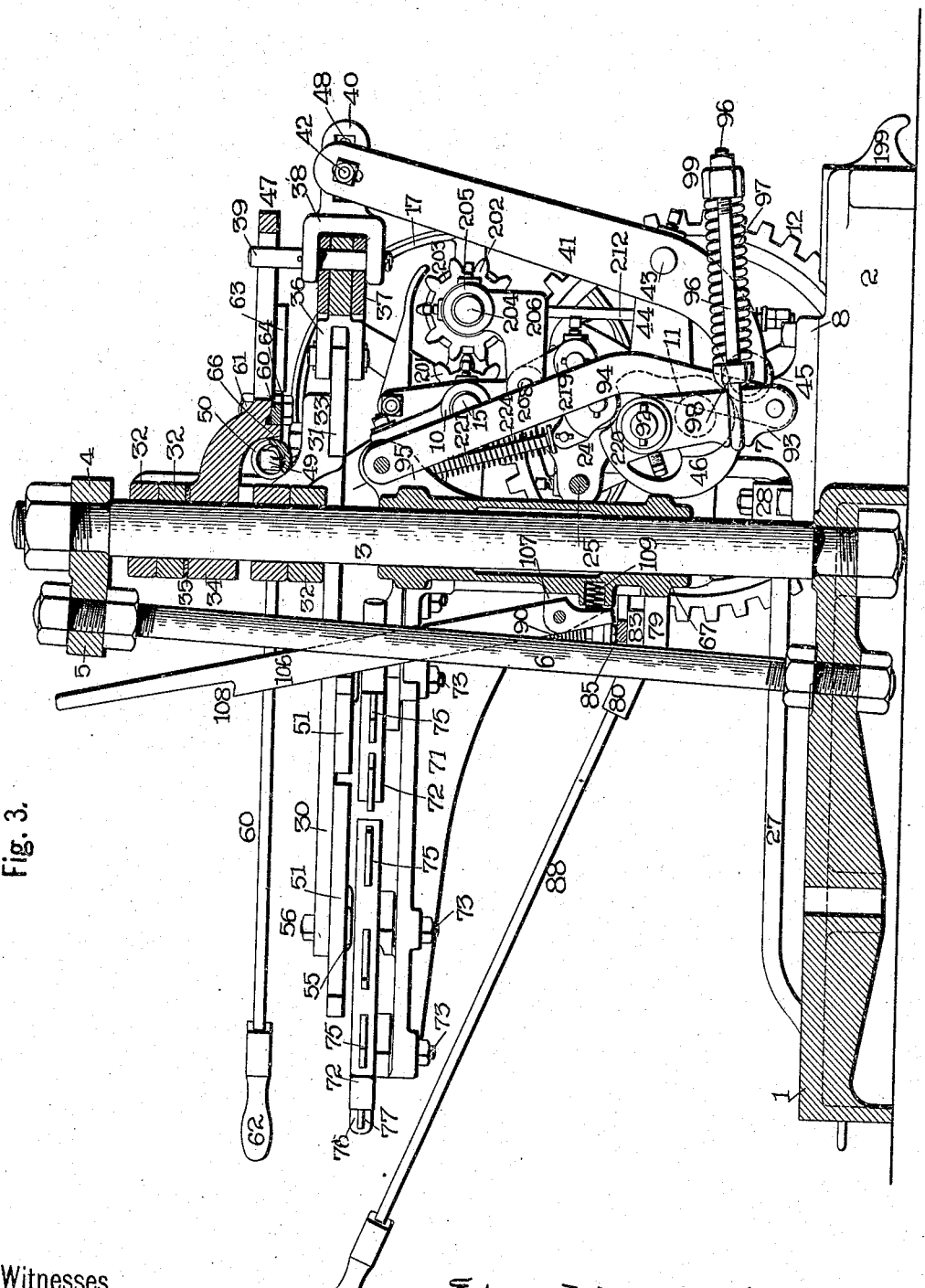
Figure 24:
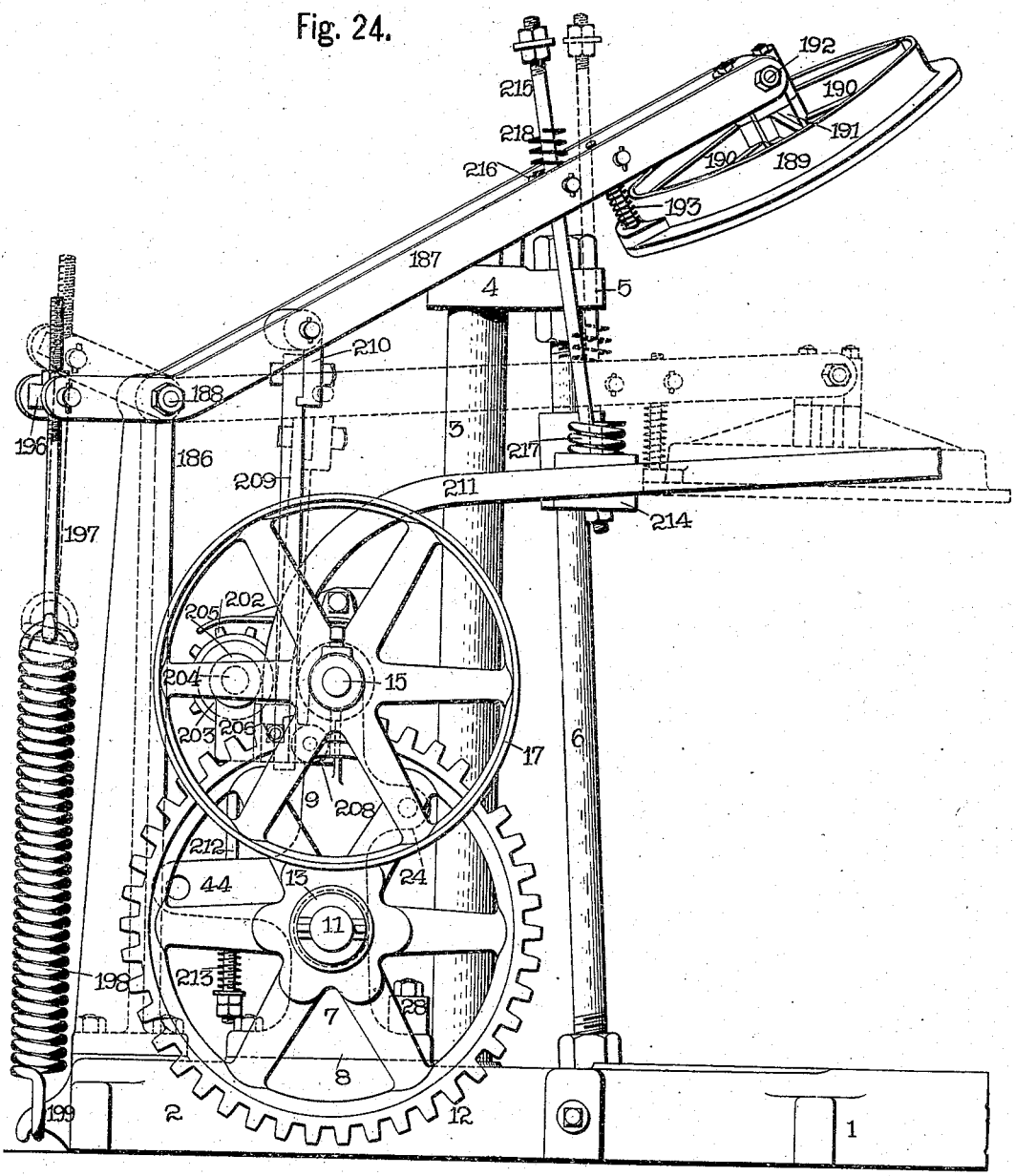
Figure 25:
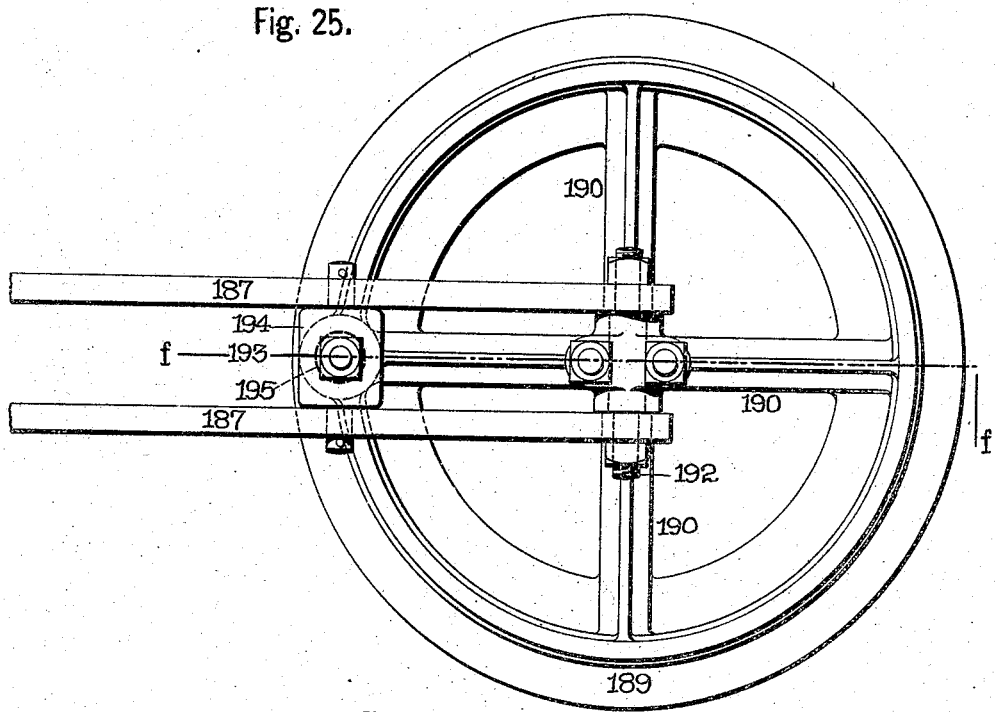
Figure 26:
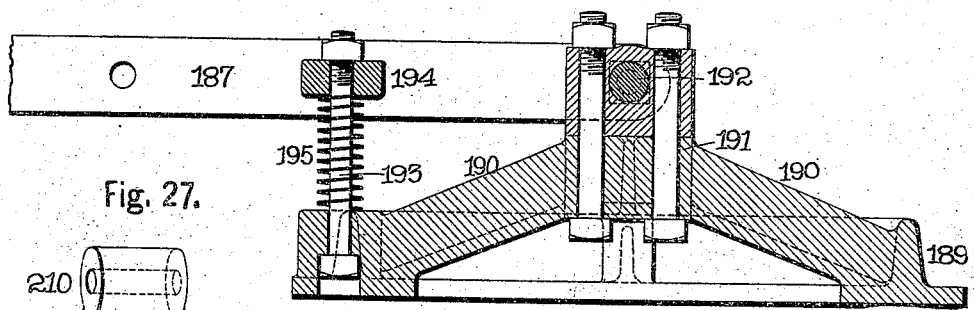
Figure 27:
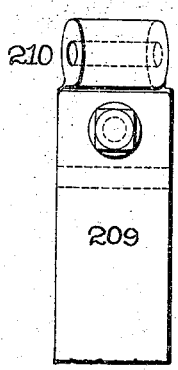
Figure 28:
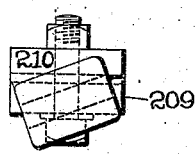
Figure 29:
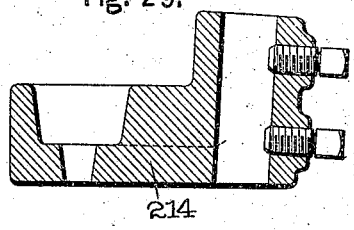

Figure 1 is a front elevation of the machine, a barrel being shown in position with the compressor arms closed to compress the staves. Fig. 2 is a top plan view of the machine. Fig. 3 is a central vertical section through the machine on line $a$ $a$, Fig. 2, the compressor arms and the driving arms being open and the mechanism for driving the end hoops being omitted. Fig. 4 is a top plan view of the compressor arms and their operating mechanism, the remainder of the machine being omitted. Fig. 5 is an enlarged fragmentary top plan view of the rear ends of the compressor arms, the yokes for supporting the arms and the toggle connection for closing the arms. Fig. 6 is a section on line $b$ $b$, Fig. 5. Fig. 7 is an enlarged detached plan view of the collar and tail piece. Fig. 8 is a transverse section through the compressor arm on line $c$ $c$, Fig. 5. Fig. 9 is a plan view of the bilge hoop driving mechanism and its operating mechanism, the remainder of the machine being omitted. Fig. 10 is an enlarged fragmentary plan view of the outer end of one of the driving arms, showing a horizontal section through one of the curved plates which carry the drivers. Fig. 11 is an enlarged transverse section through the vertical bar, the sliding sleeve, and the rear ends of the driving arms, showing a plan view of the system of levers for operating and closing the driving arms. Fig. 12 is an enlarged detached front view of the sliding sleeve. Fig. 13 is a transverse section on line $d$, $d$, Fig. 10. Fig. 14 is a transverse section on line $e$, $e$, Fig. 10, through the curved plate and one of the drivers. Fig. 15 is a fragmentary side view of the system of levers shown in Fig. 11. Fig. 16 is an enlarged detached rear view of the vertical bracket and the mechanism mounted thereon, the rock shaft and rocking lever being omitted and the intermeshing gear and pinion being shown in section. Fig. 17 is an enlarged detached top plan view of the slotted block which engages with the foot lever to start the machine. Fig. 18 is an enlarged detached side view of the vertical bracket and the mechanism mounted thereon, looking in the direction of the arrow V, Fig. 16. Fig. 19 is an enlarged detached side elevation of the vertical bracket, showing the clutch mechanism, a section being shown through the clutch pins. Fig. 20 is an enlarged detached side view of the latch for automatically setting the clutch. Fig. 21 is a view of the mechanism shown in Fig. 18, looking in the direction opposite to the arrow V, Fig. 16. Fig. 22 is an enlarged section through the automatic take-up connecting rod. Fig. 23 is a detached longitudinal section through the swinging bracket. Fig. 24 is a side elevation of the mechanism for driving the end hoops, the remaining mechanism of the machine being omitted. Fig. 25 is an enlarged detached top plan view of the end hoop driving ring. Fig. 26 is a section on line $f$ $f$, Fig. 25. Figs. 27 and 28 are enlarged detached side and plan views of the friction board and the block for connecting it to the parallel arms. Fig. 29 is an enlarged detached section through the buffer arm. Fig. 30 is a plan view of the main portion of the base showing the barrel centering and the barrel spiking devices. Fig. 31 is an enlarged vertical section through the barrel centering device on line $g$, $g$. Fig. 30. Fig. 32 is an enlarged detached plan view of the curved spiking arm. Fig. 33 is a side elevation of the barrel spiking device. Fig. 34 is an enlarged detached side elevation of the pneumatic head conveying apparatus. Fig. 35 is a fragmentary top plan view of the ring on the head feeder. Fig. 36 is a detached top plan view of the plate of the head feeder for supporting the barrel heads. Fig. 37 is an enlarged longitudinal section through the suction plate and the horizontal tube of the pneumatic conveying mechanism. Figs. 38 and 39 are enlarged detached front and plan views of the self adjusting crane for supporting the horizontal tube of the pneumatic head conveying mechanisms. Fig. 40 is an enlarged section through the brake clutch of the head feeding mechanism. Fig. 41 is an enlarged detached plan view of the brake clutch of the head feeding mechanism. Fig. 42 is an enlarged detached plan view of one of the clutch blocks. Fig. 43 is a plan view of the head feeding mechanism. Fig. 44 is a side elevation of the head feeding mechanism. Fig. 45 is an enlarged section on line $h$ $h$, Fig. 43. Fig. 46 is an enlarged detached top plan view of one of the angular plates of the head feeding mechanism.

In referring to the drawings for the details of construction, like numerals designate like parts.

The base of the machine is preferably formed as shown in Figs. 1, 2, 3, 4, 9, 24 and 30, and comprise a main portion 1, and a rearward extension 2.

A vertical bar 3, is fastened to the main portion 1, of the base, near the rear edge thereof, the lower end of the bar 3 being reduced and screw threaded and passed through an opening in the base. A nut is screwed upon the lower extremity of the reduced end of the bar and rigidly fastens the bar 3, in place, see Fig. 3. The upper extremity of the bar 3, is reduced and screw threaded similarly to the lower extremity and passes through an opening in a horizontal plate 4. A nut screws upon the upper end of the bar above the plate 4, and securely fastens the plate to the bar. The plate 4, has a forward extension 5, and a diagonally extending brace rod 6, has its lower end screw threaded and passed through an opening in the base directly in front of the bar 3, and fastened in place by opposed nuts. The upper end of the brace rod is also screw threaded and passed through an opening in the extension 5, of the plate 4, and is fastened by opposed nuts in the same manner as the lower end, see Fig. 3.

The operating mechanism of the machine is supported in a vertical bracket which is secured to the rear extension 2, of the base and is illustrated in Figs. 2, 3, 4, 9, and particularly in Figs. 16 to 23, inclusive, to which figures reference will be had in the following description.

The main portion 7, of the bracket has a horizontal bottom portion 8, through which bolts are passed to secure the bracket in place, and vertical end portions 9, which terminate in bearings 10.

A transversely extending horizontal main shaft 11, is journaled in a bearing which is formed in the main portion 7, of the bracket, the ends of the shaft extending beyond the bearing at each end. A large spur wheel 12, is supported upon one end of the shaft 11, so as to rotate independently thereof, the spur wheel being held in place by a collar 13, which is secured upon the shaft end by a pin driven through the shaft. The spur wheel 12, meshes with a pinion 14, which is mounted upon a transversely extending horizontal driving shaft 15. This shaft is journaled in the bearings 10, vertically above the shaft 11. The pinion 14, has two laterally extending lugs 16, which engage with similar lateral lugs formed upon the hub of the driving pulley 17. The driving pulley is rigidly secured to the shaft by a set screw which screws through the pulley hub as shown in Fig. 24. By this simple construction the pinion and driving pulley are locked to each other by interlocking lugs and the pulley removably fastened to the driving shaft by a set screw, so that the pinion may be easily and quickly replaced if necessary on account of breakage or wear.

As before stated, the spur wheel 12, is loosely mounted upon the main shaft 11, so as to rotate independently thereof. The spur wheel is locked to the shaft at certain intervals by a clutch device so as to rotate the shaft. This clutch device is illustrated particularly in Fig. 19. The spur wheel 12, has a comparatively large hub from which a series of short pins 18, project at equal distances from the center of the hub and from each other. These pins 18, are preferably made of steel and are embedded in the hub when the casting is made and they project from the side nearest the bracket 7, see Fig. 16. A crank 19, is fastened by a key to the shaft 11, between the spur wheel and the bracket 7, and said crank 19, has a clutching hook 20, pivoted to its outer end by a pin which extends through the crank and the hook. This hook 20, is adapted to engage with one of the pins 18, when the spur wheel revolves and as the crank is securely keyed to the shaft, rotate the shaft. The crank 19, has a lug 21, formed thereon and said lug has a pocket in which a coiled spring 22, is seated. The outer end of the spring seats against a lug 23, formed upon the upper end of the hook 20, and tends to throw the hook into engagement with one of the pins 18. The clutch device is operated by means of a foot lever which extends to within convenient reach of the operator.

A lug 24, projects from the front of each of the vertical end portions 9, of the bracket, and a horizontally extending rod 25, is supported in the lugs 24, so as to slide therein. One end of the rod 25, projects beyond the lug 24, adjacent to the clutch device and is adapted to catch against or engage with one edge of the lug 23, on the hook 20, see Figs. 16, 18 and 19.

A block 26, is fastened by a set screw to the rod 25, between the bearing lugs 24, and said block has a vertical opening formed therein as shown in Fig. 17. An angular foot lever 27, has its rear end bent upward substantially at right angles with its upper extremity, passed loosely through the opening in the block 26. The main portion of the foot lever 27, extends horizontally forward and curves to follow the contour of the front end of the base 1, thereby forming a crank. The front extremity of the foot lever is flattened and serrated to form a convenient foot treadle for the operator, see Fig. 4.

A bearing block 28, is bolted to the horizontal portion 8, of the bracket and forms a bearing for the rear end of the foot lever 27, see Fig. 19.

A coiled spring 29, encircles the rod 25, between the block 26 and one of th elugs 24, and serves to normally keep the end of the rod in engagement with the hook 20, see Fig. 16.

The operation of this portion of the machine is as follows: The pulley 17, is rotating continuously thereby rotating the driving shaft 15, and through the pinion 14, rotating the spur gear wheel 12, which is loosely mounted upon the main shaft 11. The operator wishing to start the machine, steps upon the front end of the foot lever 27, which is really a crank and depresses it, thereby rocking the horizontal portion of the foot lever. This causes the vertical rear portion of the foot lever to rock which by means of the block 26, slides back the bar 25. This permits the hook 20, to drop, being assisted by the coiled spring 22, and engage with one of the pins 18, which are rotating with the spur gear 12. The hook catches around one of the pins as shown in Fig. 19, and the hook 20, and crank 19, are thus locked to the spur wheel and revolve with it, thereby rotating the shaft 11, and starting the machine. When the machine has started, the operator releases the foot lever, thereby permitting the spring 29, to return the bar 25, to its normal position. The main shaft makes one revolution and as the hook 20, comes around, the lug 23, strikes against the end of the rod 25, thereby releasing the hook 20, from the pin 18, and stopping the machine.

In order to remove the truss hoops from the barrel, a compressing mechanism is provided which compresses the staves of the barrel and holds them in a compressed condition until the truss hoops have been removed, the head put in place and the bilge and end hoops driven. This mechanism is illustrated in Figs. 2 to 8, inclusive, to which figures reference will be had in the following description.

The compressor arms, two in number, are formed substantially as shown in Figs. 4 and 5, and have curved forward portions 30, which partially encircle the barrel, and straight rear portions 31, the ends of which are connected by a toggle device.

Each compressor arm is supported by a yoke 32, which has a horizontal portion 33, in the bottom surface of which a recess is formed. The straight portion 31, of the compressor arm is seated in the recess and securely fastened in place by bolts, see Fig. 6.

The yokes 32, have vertical openings formed therein, through which the vertical bar 3, loosely passes, so as to permit the compressor arms to swing horizontally. The yokes 32, are supported upon the bar 3, by a heavy collar 34, which is securely fastened to the bar 3, by set screws, see Fig. 7. Each yoke 32, is forked so that part of each yoke fits above and part below the collar 34, as shown in Fig. 6. A washer 35, may be interposed between the upper surface of the collar 34, and the bottom surface of the adjacent yoke.

The rear ends of the straight portions 31, of the compressor arms are connected by a set of toggles as shown in Fig. 5. Two links 36 and 37, have their outer ends forked and straddle the ends of the compressor arms, being pivoted thereto by pins. The inner ends of the links are fitted into a yoke 38, and pivoted thereto and to each other by a vertical pin 39.

The yoke 38, has an extension 40, formed integral therewith to which extension the upper end of a rocking lever 41, is pivoted by a bolt 42. The lever 41, is secured to a rock shaft 43, which is journaled in bearings 44, extending from the bracket 7. The lower end of the lever 41, below the rock shaft 43, is curved forwardly and has its extremity forked and a roller 45, is pivoted in the fork by a pin, see Fig. 3. This roller 45, travels on the face of a cam 46, which is secured by a key to the end of the main shaft 11, adjacent to the rocking lever 41. The lever 41, is fastened to the rock shaft 43, by a set screw as shown in Figs. 2 and 3.

The pin 39, which pivots the ends of the links 36 and 37, to the yoke 38, extends upward above the top of the yoke for a short distance and the collar 34, has a comparatively long tail piece 47, formed integrally therewith and extending rearwardly therefrom. This tail piece curves downwardly for a short distance and then extends horizontally backward. This horizontal portion of the tail piece has a vertical slot formed therein in which the projecting portion of the pin 39, plays, see Figs. 2 and 3. By this construction the direction of the movement of pivoting point of the toggle links 36 and 37 in a straight line back and forth and there is no wabbling from side to side or an uneven opening or closing of the compressor arms.

The pivoting bolt 42, passes through a vertical slot in the upper end of the rocking lever 41, and through a horizontal slot 48, in the extension 40, on the yoke 38, see Fig. 3. This provides for a very fine adjustment of the rocking lever with respect to the toggle device so that the exact movement which is necessary to compress the barrel may be obtained.

The horizontal portion 33, of each yoke 32, has a vertical lug 49, formed integral therewith and one end of a coiled spring 50, is secured to each of the lugs 49, as shown in Figs. 5 and 6. The purpose of this spring is to automatically return the compressor arms to their open or normal position upon the release of the toggle device. The compressor arms do not themselves touch the barrel, but each compressor arm has a number of segmental plates pivoted thereto which plates come into contact with the barrel staves when the compressor arms are closed.

In the preferred construction, four segmental plates are employed, two plates being pivoted to each compressor arm. Each segmental plate 51, has its inner edge curved to a circle which is of about the same radius as the body of the barrel which is to be operated upon. Each segmental plate 51, has a laterally extending lug 52, which has a vertical opening 53, formed therein. This opening 53, is rectangular in shape and a block 54, having two parallel horizontal flanges 55, extending from its bottom edge, is fitted in the opening 53, see Fig. 8. The flanges 55, extend beneath the bottom surface of the lug 52, and thus support the segmental plate 51.

A bolt 56, having a countersunk head passes through the block 54, and through the compressor arm 30, and secures the block 54, and the segmental plate 51, to the compressor arm.

A horizontal rod 57, has one end screwed into the block 54, and passes loosely through an opening in the lug 52, on the segmental plate 51. The rod 57, projects beyond the lug 52, for some distance and is encircled by a coiled spring 58; the spring being held in place by a washer and a nut screwed upon the outer end of the rod, see Fig. 8. This construction gives the segmental plate a certain range of movement against a spring cushion to adapt itself to the irregularities in the shape of the barrels.

The compressor arms are released by a lever which is shifted by the operator to break the toggle.

The tail piece 47, has a laterally extending lug 59, and a hand lever 60, is pivoted near its rear extremity to the lug 59, by a vertical bolt 61. The rear portion of this hand lever extends transversely and directly beneath the tail piece 47. Beyond the pivoting bolt 61, the hand lever curves and extends diagonally forward to within convenient reach of the operator. The front end of the hand lever has a handle 62, fastened thereto by a set screw, see Fig. 2. The extreme rear end of the hand lever 60, is reduced slightly and lies adjacent to the pin 39, when the toggle is spread to compress the barrel.

A lug 63, is formed upon one edge of the tail piece 47, and this lug has a pocket in which a block 64, is fitted and adapted to slide. A coiled spring 65, is placed in the pocket in the rear of the block 64, the spring being held in place by a pin, see Fig. 7. A depending lug 66, is formed on the bottom surface of the tail piece 47, to limit the forward movement of the transverse portion of the hand lever 60. The purpose of the block 64, and spring 65, is to keep the lever pressed tightly against the depending lug 66.

The operation of this barrel compressing mechanism is as follows:—The machine is started as before described and the cam 46, revolves with the main shaft 11. The cam operating against the roller 45, causes the upper end of the rocking lever 41, to move inwardly carrying with it the yoke 38. This causes the toggle links 36 and 37, to spread thereby spreading the rear ends of the compressor arms and causing the portions 30, of the arms to close around the barrel. When the barrel is fully compressed, the pin 39, is just a trifle beyond the center; that is, the center of the pin is just within a straight line drawn from center to center of the pins which pivot the toggle links 36 and 37, to the ends of the compressor arms, see Fig. 5, where this is plainly shown. The purpose of this is so that the compressor arms cannot release themselves, but are released by the hand lever 60, at the will of the operator. When it is desired to release the compressor arms, the handle 62, is grasped by the operator and the lever 60, moved in a direction toward the center of the barrel. This causes the extreme rear end of the lever to move toward the pin 39, and striking against it, to force it back beyond the center, when the tension of the coiled spring 50, causes the compressor arms to open, as shown in Fig. 4.

The spring cushions of the segmental arms provide for slight differences in the diameter of the barrels operated upon. Barrels of different sizes may be hooped and headed in this machine by substituting segmental plates 51, of different sizes.

The mechanism for driving the bilge hoops is illustrated in Figs. 1, 2, 3, and Figs. 9 to 15, inclusive. This mechanism is mounted upon the vertical bar 3, and is capable of a vertical up and down movement upon said bar. The mechanism consists principally of a sleeve slidably mounted upon the bar 3; two curved arms being pivotally connected to said sleeve and carrying the hoop drivers; a system of levers for closing the arms around a barrel and bringing the hoop drivers into contact with the barrel staves and a crank mounted upon the main shaft 11, and connected to the sliding sleeve on the bar, so as to give a vertical reciprocating movement to the curved arms.

In the preferred construction of this mechanism as illustrated in the drawings, the sleeve 67, is made of considerable length so as to have a comparatively long bearing upon the bar 3. The sleeve has two upper and two lower laterally extending lugs 68 and 69, in which the ends of vertically extending pivot pins 70, are fastened by set screws, see Fig. 12. The curved arms 71, which carry the hoop drivers, have their rear ends enlarged and provided with vertical openings through which the pins 70 pass, the curved arms being supported upon the pins between the upper and lower lugs 68 and 69, see Fig. 11. The hoop drivers are carried in a plurality of segmental plates 72, which are secured to the top surface of the curved arms 71, which will be hereinafter termed the "driving arms." These segmental plates are preferably four in number, two being carried by each driving arm 71. Each plate 72, has two vertical T slots through which bolts 73, are passed to fasten the plate to the driving arm, see Figs. 10 and 13. Each segmental plate 72, has a plurality of horizontally extending radial slots 74, in which the hoop drivers 75 are seated. In the preferred construction each segmental plate has three drivers as shown in Fig. 10.

Tubular extensions 76, extend radially outward from the outer curved edge of each segmental plate 72, at about the middle of each radial slot 74. The drivers 75, have their inner edges curved to conform with the curved shape of the barrel body and their outer edges forked as shown at 77, in Fig. 10. The forked outer ends of the drivers straddle the tubular extensions 76, as shown in Fig. 10; the tubular extensions forming pockets in which coiled springs 78, are seated. These coiled springs press against the edge of the driver as shown in Figs. 10 and 14, and permit a slight radial movement of the driver so that they can adjust themselves to the slight unevenness and irregularities in the shape of the barrel body.

Split pins are passed vertically through the forked ends of the drivers to prevent their involuntary displacement from the radial slots; and split pins are also passed through the outer ends of the tubular extensions 76, to secure the spring 78, in place, see Figs. 10 and 14.

By loosening the bolts 73, and adjusting the segmental plates 72 on the driving arms 71, provision can be made for driving hoops upon barrels of different sizes.

The system of levers for closing the driving arms around a barrel body and bringing the drivers 75, into contact with the staves is illustrated in Figs. 11 and 15. One of the lower lugs 69, of the sliding sleeve 67, has a laterally extending arm 79, formed integral therewith. A block 80, is pivoted to the outer end of the arm 79, by a vertical pin 81, which is secured in place by a nut screwed upon its lower end. This block 80, is provided with oppositely extending lugs 82 and 83, which are connected by connecting links 84 and 85, to lugs 86 and 87, extending inwardly from the driving arms 71. The links 84 and 85, are pivoted to the lugs 82 and 83, and 86 and 87, by bolts as shown in Fig. 11. The rear end of a diagonally extending hand lever 88, is seated in the block 80, and secured thereto by set screws. The front end of the hand lever 88, has a handle 89, fastened thereto which is grasped by the operator to shift the lever. The pin 81, projects above the top surface of the block 80 for a short distance, the projecting end of the pin being of slightly greater diameter than the lower portion. A torsion spring 90, encircles the projecting end of the pin 81, the upper end thereof being secured by a collar 91, which is fastened to the upper end of the pin 81, by a set screw. The lower end of the torsion spring 90, is bent at right angles and catches over a lug 92, on the block 80, see Fig. 15. The tendency of this torsion spring is to return the block 80, to its normal position and thus reopen or return the driving arms to their normally open position, after they have been closed by the operator shifting the lever 88.

The vertically reciprocating motion is imparted to the sleeve 67, and the driving arms by a crank and connecting rod of peculiar construction. This connecting rod is so formed that a hoop can be driven upon a barrel with a predetermined pressure and when this pressure is reached the driving arms remain stationary while the crank completes the remainder of its movement. By this construction the natural elasticity of the barrel stave and the hoops and also the slight differences in sizes is provided for as it is a well known fact that barrels of the same capacity and also the hoops vary slightly and therefore the hoops cannot be driven with a certain length of stroke. The position of the hoops is determined by the amount of pressure required to drive them into place.

In the preferred construction of this device as illustrated in Figs. 3, 9, 21 and 22, a crank pin 92, extends from the outer side of the cam 46, which is mounted upon the main shaft 11. A forked arm 93, is loosely mounted upon the crank pin 92, being held in place by a transverse pin which is driven through the crank pin. A washer is interposed between the transverse pin and the hub of the forked arm 93. A connecting rod 94, has its lower end pivoted to the lower end of the forked arm 93, and its upper end pivoted between two lugs or ears 95, extending from the upper rear portion of the sliding sleeve 67. This connecting rod is bent at an intermediate point so that its lower end fits between the forks of the arm 93, see Fig. 22. A comparatively long U bolt 96, straddles the forked arm 93, and the connecting rod 94, and has its bent end seated in notches formed in the edge of the forked arm. The ends of the U bolt extend rearwardly and straddle a coiled compression spring 97, which is held in place between the sides of U bolts by spring caps 98 and 99. These spring caps have lateral lugs through which the U bolt passes, the cap 99, being fastened in place by nuts which screw upon the outer ends of the U bolt. The spring cap 98, has a semi-spherical bearing edge which bears against the rear edges of the forked arm 93, see Fig. 22, where this is clearly shown. A depression is formed in the center of the spring cap 98, to provide room for the passage of the connecting rod 94, see Fig. 22. The U bolt is prevented from displacement by grooves which are formed in the outer sides of the forked arm 93, and in which the straight portions of the U bolt seat.

A device for automatically starting the machine upon the closing of the driving arms is provided and is illustrated in Figs. 9, 11, 16 and Figs. 18 to 21, inclusive. One end of the rod 25, extends past the bearing 24, for a considerable distance and has a latch device fastened thereon. This latch device consists of a block 100, which is secured to the rod 25, by a set screw, see Fig. 16, and has a laterally extending pin 101, upon which a bar 102, is pivoted. The pin 101, passes through one end of the bar 102, and the other end of the bar is bent at right angles to form a narrow vertical flange. The bar 102, is supported upon a horizontal lug 103, which extends from the lower front edge of the block 100, and passes beneath the bar 102. A diagonally extending lug 104, extends upward and outward from the block 100, and limits the upward movement of the bar 102. A rearwardly projecting finger 105, is formed on the enlarged pivoting end of one of the driving arms and the latch device is fastened to the rod 25, close to the projecting finger 105, as shown in Fig. 9.

The operation of mechanism for driving the bilge hoops is as follows,—The operator grasps the handle on the end of the hand lever 88, and moves it toward the barrel. This shifts the block 80, and by means of the connecting links 84 and 85, draws the driving arms 71, toward each other and closes the drivers around the barrel and above the hoop. The swinging of the driving arms upon their pivots brings the finger 105, into contact with the end of the latch bar 102, and moves it horizontally thereby withdrawing the bar 25, in the same manner as the foot lever 27, heretofore described. This permits the clutch block 20, to engage with the pins 18 and revolve the main shaft 11. The cam 46, which is keyed to the main shaft acts as a crank in which the crank pin 92, is fastened. The tension of the heavy spring 97, holds the connecting rod 94, firmly to the forked arm 93, so as to form an almost rigid connection between the crank pin 92, and the sleeve 67, see Fig. 3. As the main shaft revolves and carries with it the crank pin 92, the connecting rod pulls down the sleeve 67, which carries the driving arms and thus drives home the hoops. If the barrel is a trifle too large, or the hoops are a trifle too small so that they will not move a distance equal to the throw of the crank pin 92, then, as soon as the hoops have been driven so far so as to resist a certain predetermined pressure the spring 97, will give and the lower end of the connecting rod 94, will move back and compress the spring while the sleeve 67, remains stationary. When the crank pin 92, has reached the bottom of its stroke and starts on its upward movement, the spring will first expand and regain its normal length and then the connecting rod 94, carries the sleeve 67, and driving arms 71, upward. By tightening the nuts on the U bolts 96, against the spring cap 99, the spring is compressed and its tension increased so that hoops may be driven upon a barrel with any predetermined pressure. As the sleeve 67, and the driving arms 71, move downward, the finger 105, on the driving arm slides downwardly past the bar 102, and permits the spring 29, to return the rod 25, to its normal position so as to release the clutch when the hook 20, completes its revolution as before described. Upon the upward movement of the sleeve, the finger 105, strikes against the bottom edge of the bar 102 and lifts it up, swinging it on its pivoting pin 101. When the driving arms are opened the bar 102, falls back into place by gravity.

The truss hoop removing device is illustrated in Figs. 3, 9 and 12. The lower end of a thin, flat diagonally extending bar 106, is pivoted by a pin between two ears or lugs 107, which project from the front side of the sleeve 67, and near the lower end thereof, see Fig. 12. This bar passes through a long narrow slot in the diagonal brace rod 6, and is cut away at its upper end to form a shoulder 108, see Fig. 3. The slot in the diagonal brace rod 6, is shown by dotted lines in Fig. 3. The lower end of the truss hoop removing bar 106, projects below the pivot pin and engages with a short coiled spring 109, which is seated in a pocket formed in the sleeve 67, between the lugs 107. The pressure of the spring 109, against the lower projecting end of the bar 106, keeps it in an upright position.

A device for centering the barrel and spiking or securing it while the truss hoop is being removed is provided and the preferred construction thereof is illustrated in Figs. 1, and 30 to 33, inclusive. An angular arm 110, is secured by a bolt 111, to one of the front lugs by which the base is secured to the floor. The outer end of this arm extends vertically upward and carries a Y shaped barrel centering piece 112, which is adjustably secured thereto by a bolt 113, which passes through a slot in the tail of the Y shaped piece 112. By loosening the bolt 113, the Y shaped piece can be adjusted toward or from the center of the base to provide for barrels of different sizes. A block 114, having a crotch formed in its upper surface is secured to the arm 110, by a bolt as shown in Fig. 31. This crotch forms a front bearing for the foot lever 27. The barrel spiking device is placed upon the opposite side of the base as shown in Fig. 30. A bell crank 115, is pivoted upon a pin 116, which extends horizontally from the side of the base 1. One arm of the bell crank extends in a vertical direction and the other one diagonally forward and terminates in a foot step or treadle 117. The upper end of the vertical arm of the bell crank engages with the rear side of a lug 118, which projects horizontally from a curved arm 119. This curved arm is pivoted at its rear end to a pin 120, which extends vertically from the top of the base 1 and is supported thereon by two collars 121, so as to swing thereon in a horizontal direction. The opposite end of the arm 119, is equipped with a spike 122, which is held in place by a set screw. A coiled spring 123, has one end secured to the lug 118, and its other end fastened to a vertical bar 124, which has its lower end secured by a set screw in an extension 125, of the base 1. The vertical arm of the bell crank 115, has a horizontal lug 126, extending inwardly over the base with a set screw passing through its inner end, see Figs. 30 and 32. This limits the backward movement of the bell crank.

The operation of the barrel centering and securing and the truss hoop removing mechanism is as follows,—The operator places a barrel in position upon the base, and presses downward with his foot upon the foot step 117, on the end of the bell crank 115. This rocks the bell crank on its pivot and by means of its vertical arm swings the curved arm 119, inward and drives the spike 122, into the barrel. This presses the barrel into the forked portion of the Y piece 112, and accurately centers it. The machine is now started by pressing upon the foot lever 27, and closing the compressor arms around the barrel and compressing the staves as heretofore described. The sleeve 67, and driving arms 71, make their downward movement as before described, the driving arms, however remaining open as shown in Fig. 2. When the sleeve 67, has reached the limit of its downward movement, the operator reaches over the top of the barrel and grasping the reduced upper end of the truss hoop removing bar 106, pulls it forward toward the barrel. As the sleeve 67, moves upward and carries the bar 106, with it, the shoulder 108, catches under the heavy truss hoop and lifts it up, the barrel being held by the spike 122. The compressor arms are now released and the truss hoop lifted off the barrel.

A head feeding device, and a pneumatic mechanism for carrying the heads from the head feeder to the barrel are provided and are illustrated in Figs. 1, 2, and Figs. 34 to 46, inclusive. The base 127, of the head feeder is preferably rectangular in shape and a circular ring 128, is supported by two vertical rods 129, at a considerable height above the base. The rods 129, are secured by set screws in sockets in the rear portion of the base as shown in Fig. 44. The ring 128, has a lateral projection 130, through which the upper ends of the rods 129, pass, the ring being fastened thereto by set screws. Additional supporting rods 131, have their lower ends secured to lugs 132, extending from opposite sides of the base and their upper ends passed through openings in opposite sides of the ring and secured in place by set screws.

A circular plate 133, has a rearwardly extending arm 134, provided with two vertical openings 135, through which the rods 129, loosely pass. The arm 134, also has a central opening 136, in which the lower end of a central vertical rod 137, is seated being secured in place by a set screw, see Fig. 36. This rod 137, extends vertically upward and passes loosely through an opening 138, in the lateral projection 130, of the ring 128, see Fig. 35. When the plate 133, is in its lowest position, the rod 137, projects above the ring 128, for a considerable distance, see Fig. 44.

The ring 128, has an inwardly extending annular flange 139, and a series of angular plates 140, are held against the bottom surface of the flange 139, by bolts which pass through slots 141, in the plates and through tapered openings in the annular flange. A spring 142, encircles the bolt above the flange being held in place by a washer and nut, see Fig. 45. The inner surface of the upright portion of each angular plate 140, has a projection 143, formed thereon as shown in Fig. 45, the object of which will be explained farther on.

Segmental blocks 144, of wood are secured to the face of the plate 133, by bolts as shown in Fig. 43, the pile of heading 145, being placed upon the blocks of wood as shown in Fig. 1. The circular plate 133, is directly beneath the center of the ring 128, so that when the plate is carried upward the heading will pass through the ring.

The plate 133, is carried upward by means of a clutch device which is operated by a foot lever. Two clutches are used, one to carry the plate upward and one to prevent its involuntary downward movement, but as both clutches are constructed alike, one only will be described, the reference numerals being applied to similar parts of the second clutch.

The clutch for elevating the plate is secured to the upper end of a vertical rod 146, the lower end of which is pivoted to the rear end of a foot lever 147. This foot lever is fulcrumed on a bolt passing through a lug 148, projecting from the base of the feeder and extends diagonally forward to within convenient reach of the operator being provided with a treadle 149, at its front end. The clutch consists of a block 150, which is shaped as shown in Fig. 42, and has an opening through which the rod 146, passes. The block is held in place upon the rod by lock nuts as shown in Fig. 44. The front end of the block 150, is cut out so as to straddle the central vertical bar 137. A U bolt 151, has its bent end encircling the bar 137, and its straight sides seated in depressions in the top surface of the block 150.

A plate 152, of hardened metal is bolted to the top surface of the block 152, and projects over the U bolt, thereby retaining it in place. The front edge of the plate 152, is semi-circular in form and grips the rod 137. Lock nuts are screwed upon the ends of the U bolt, secure the whole together and provide for the taking up of wear.

It will be seen that a downward movement of the front end of the foot lever will raise the rod 146, and cause the rod 137, to become wedged between the U bolt and the hardened metal plate, thereby carrying it upward. The downward movement of the rod 146, releases the clutch and slides it down the bar.

The brake clutch is similar in construction to the above described and is supported upon a short rod 153, which is fastened to the lateral projection 130, of the ring 128. The rod 153, projects above the block 150, and has a plate 154, secured to its upper end. A coiled spring 155, is fitted between the plate 152 and 154 and a coiled spring 156, encircles the rod 153, below the block 150, see Fig. 44. The tendency of these springs is to reverse the action of the other clutch and to grip the bar 137, upon its downward movement, thereby holding the bar 137, in place while the other clutch is returning to its normal position. A handle 157, projects from the block 150, of the second clutch, see Figs. 40, 41 and 44, and when the stack of heads is exhausted this handle is pressed down which releases the clutch and permits the plate 133, to return by gravity.

The head conveying device consists of a suction fan which is connected by tubular connections with a suction plate. The suction fan 158, is mounted upon the plate 4, which extends to one side of the bar 3, and is supported at its outer end by the vertical bar 124, as shown in Fig. 2. The fan is of the ordinary blower type and is rotated by a pulley 159, which is mounted upon a shaft 160, supported in bearings extending from the fan case. A vertical tubular pipe or portion 161, depends from the fan, at one side, and is pivotally connected at its lower end to the rear end of a horizontal tubular portion 162. This horizontal portion 162, has an elbow at its outer end to which a suction plate 163, is secured by a swivel connection, see Fig. 37. The vertical tube or pipe 161, is made in two parts which are pivotally connected by a vertical rod 164. This rod passes through both parts of the tube and has its lower end secured by lock nuts to an arm 165, which is secured by a set screw to the vertical bar 124. The upper end of the rod 164, projects above the top of the tube 161, and is encircled by a coiled spring 166, which holds the two parts of the tube together. A horizontal rod or bolt 167, secures the tube 161, to the tube 162, see Fig. 34. The horizontal tube is provided with a valve by means of which the draft may be shut off. The valve consists of a disk 168, which is connected by a valve rod 169, to a bell crank 170, pivoted upon a horizontal rod in the front end of the horizontal tube. A vertical rod 171, extends from the other end of the bell crank, up through the handle 172, which is grasped by the operator to convey the head to the barrel. The rod 171, has a disk at its upper end for operating the valve.

The horizontal tube 162, is supported by a self-balancing crane which is illustrated in Figs. 34, 38 and 39. A bracket 173, is supported upon the bar 124, so as to swing thereon. A curved arm 174, is pivoted by a bolt to the bracket and has a yoke 175, at its outer end in which the horizontal tube rests. The rear end of the arm 174, extends diagonally upward and has an enlargement formed upon its upper end. The bracket 173 has a lug 176, formed integral therewith and a rod 177, passes vertically through the lug 176, and through the upper end of the arm 174. Upper and lower compression springs 178 and 179, encircle the projecting ends of the rod 177, being held in place by spring caps 180. A set screw 181, passing through a lug extending from the bracket 172, limits the upward movement of the arm 173; the downward movement of the arm being limited by the tension of the springs 178 and 179.

A torsion spring 182, encircles the bar 124, within the bracket 172, and returns the suction plate to its normal position over the head feeder, after a head has been put into a barrel. The suction plate is held in place over the head feeder by projecting plates 183, which are secured to the suction plate and which pass under pivotal arms 184. The arms 184, are pivoted to vertical projections on the ring 128, and are provided with counter-balancing weights so as to regain their normal position when moved. The tension of the springs 178 and 179, normally keep the plates 183, seated against the bottom edges of the arms 184. A downward pressure upon the suction plate permits the spring 185, to turn the suction plate on its swivel and disengage the plates 183, from the arms 184.

When the head is in place in the barrel, the end hoops are driven into place by a mechanism which is illustrated in Figs. 1, 2 and Figs. 24 to 29, inclusive. A vertical standard 186, is bolted to the rear portion of the extension 2, of the base and a pair of parallel arms 187, are pivoted near their rear ends to the standard by a bolt 188. These parallel arms extend diagonally over the top of the machine, see Fig. 2, and carry a hoop driving ring 189, at their outer ends. The hoop driving ring is formed as shown in Figs. 25 and 26, having arms 190, which connect the ring to a central hub 191. The hub is pivoted on a transverse pin 192, which has its ends passed through the parallel arms and is fastened in place by nuts, see Fig. 25.

In order to prevent the hoop driving ring from swinging on its pivot and yet allow it a certain range of movement a vertically extending bolt 193, has its lower end seated in the ring 189, and its upper end passed loosely through an opening in a transverse block 194, which is pivoted between the parallel arms 187. A coiled spring 195, encircles the bolt between the ring and the block and serves to keep the ring normally in position parallel with the parallel arms, and still permits the ring to turn on its pivot sufficiently to adjust itself to the top of the barrel when the end hoops are being driven in place. The ends of the parallel arms extend slightly beyond the standard and are bent at a slight angle to the remainder of the arms as shown in Fig. 24. A block 196, is pivoted between the rear ends of the parallel arms and a rod 197 having two oppositely extending hooks formed on its lower end, has its upper end passed through the block 196, and held in place by a nut as shown in Fig. 24. Two heavy extension springs 198, have their upper ends hooked over the lower end of the rod 197, and their lower ends secured to two lateral lugs 199, projecting from the extension 2, of the base 1. The parallel arms are drawn down to bring the driving ring into contact with the end of the barrel by a set of friction rollers which engage with a friction board depending from the parallel arms.

A friction roller 200, is mounted upon the driving shaft 15, the roller having a finger gear wheel 201, formed integral therewith. The finger gear 201, meshes with a similar gear 202, having a friction pulley 203, attached and which is mounted on a shaft 204. This shaft is supported in bearings 205, on a swinging bracket 206, which is pivoted by a rod 207, to lugs 208, extending from the vertical portions 9 of the bracket 7. A friction board 209, depends from the parallel arms and passes between the friction rollers 200 and 203. The upper end of the board is fastened by a bolt to a block 210, which is pivoted by a bolt between the parallel arms. The swinging bracket 206, is moved to grip the friction board 209, between the rollers 200 and 203, by means of a lever 211. The rear end of this lever is fastened to the swinging bracket by a bolt and then curves up and over the top of the machine and then extends forward to within convenient reach of the operator, see Fig. 24. A rod 212, depends from the swinging bracket and passes through a rib on one of the bearings 44, extending from the bracket 7. A coiled spring 213, encircles the lower end of the rod 212, and serves to normally keep the roller 203, disengaged from the friction board.

A buffer device for the end hoop driving mechanism is provided which consists of an arm 214, secured to the brace rod 5, by set screws and having a depression in its outer end. A rod 215, passes through the outer end of the arm 214, and through a block 216, which is pivoted between the parallel arms. A coiled spring 217, is seated in the depression in the arm 214, and a coiled spring 218, encircles the rod above the block 216. These springs act as buffers to cushion the blow at the end of the swinging movement of the parallel arms.

A device for assisting in disengaging the hook 20, from the clutch pins 18, is provided and is illustrated in Fig. 21. An arm 219, is pivoted to a lug extending from the vertical portion 9 of the bracket 7, adjacent to the cam 46. This arm carries a roller 220, which travels on the face of the cam and engages in a depression in the face of the cam. A rod 221, has its lower end pivoted to the end of the arm 219, and extends diagonally upward and through a block 222, which is bolted to a lug 223, extending from one of the bearings 10, see Fig. 21. A coiled spring 224, encircles the rod and keeps the roller in engagement with the face of the cam. The action of this is as follows,—As the cam revolves the roller drops into the deep depression and causes a slight back motion of the main shaft which permits the hook 20, to disengage itself from the clutch pin.

The operation of the machine is as follows: The operator places a barrel in position upon the base and presses upon the foot step or treadle 117, thereby centering and spiking the barrel as above described. An end hoop is now placed upon the end of the barrel and pressed down by the operator. The operator now presses upon the foot lever 27 and starts the machine. This closes the compressor arms and compresses the staves. As the sleeve 67, moves down, the operator reaches over the barrel and grasps the truss hoops removing bar and upon the up stroke of the sleeve 67, the truss hoop is removed as heretofore described. The compressor arms are opened by shifting the lever 60, and the truss hoop removed. The bilge hoops are now put in place and the lever 88, shifted to close the driving arms around the barrel. This starts the machine as before described and drives the hoops home. When the hoops are driven the operator again shifts the lever 88 to reopen the driving arms and then removes the end hoop which had been placed on by hand. The valve of the pneumatic head conveyer is opened and a head drawn into the suction plate. The suction plate is swung over the barrel and the head deposited in the end of the barrel, the suction plate resting upon the ends of the barrel staves. The machine is again started by means of the foot lever 27, and the barrel staves compressed around the head, thereby holding it in place. The suction valve is now closed releasing the head from the suction plate which is swung over the head feeder. Two end hoops are now put upon the barrel and pressed down by the operator. The lever is now pressed downward thereby bringing the friction rollers into engagement with the friction board and drawing down the parallel arms. This causes the ring 128, to strike the end hoops and drive them home. The lever is now released and the springs 198, return the parallel arms and the ring to the position shown in Fig. 24. The barrel is now removed, turned over and the other end treated in the same manner as above described.

I claim as my invention.

1. In a barrel making machine, means for depositing a head in place in a barrel, a stave compressing mechanism, a plurality of independent hoop driving mechanisms, one of which is pivoted to move vertically to drive the end hoops and another of which is pivotally mounted to move horizontally to embrace the barrel and also move vertically to drive the bilge hoops.

2. In a barrel making machine, a frame, a main shaft journaled in said frame, a driving shaft journaled in said frame and geared to the main shaft, stave compressing mechanism, end hoop driving mechanism pivoted to move vertically and adapted to be operated from the driving shaft, and separate bilge driving mechanism driven from the main shaft, independently of the end hoop driving mechanism, substantially as set forth.

3. In a barrel making machine, a frame, a driving shaft journaled in said frame and carrying a roller, a swinging bracket mounted in said frame, a shaft journaled in said bracket and also carrying a roller, a hoop driving mechanism including a driving ring, and an arm to which said ring is pivoted and a friction strip attached to the arm and extending between the two rollers, substantially as set forth.

4. In a barrel making machine, a frame, a plurality of shafts rotatably mounted on said frame and each carrying a roller, a hoop driving mechanism including a driving ring, and an arm to which said ring is pivoted and a friction strip attached to the arm and extending between the rollers of the shafts, substantially as set forth.

5. In a barrel making machine, a frame, an end hoop driving mechanism including an arm pivoted at one extremity to the frame, a driving ring pivotally mounted at the opposite end of said arm and friction means for vertically moving said arm.

6. In a barrel making machine, a frame, an end hoop driving mechanism including a pair of parallel arms pivoted at one extremity to the frame, a driving ring pivotally mounted at the opposite end of said arm, a strip connected to the parallel arms, and means for frictionally engaging and moving said strip.

7. In a barrel making machine, a frame, an end hoop driving mechanism including an arm pivoted at one extremity to the frame, a driving ring pivotally mounted at the opposite end of said arm and friction means for moving said arm to drive hoops and spring means for returning said arm to an inoperative position upon the release of the friction means.

8. In a barrel making machine, a frame, an end hoop driving mechanism pivotally supported from the frame, friction means for moving said end hoop driving mechanism into driving position and spring means for returning said mechanism to an inoperative position upon the release of the friction means.

9. In a machine of the class described, two independent power driven hoop driving mechanisms, one of which is adapted to drive the end hoops and the other of which is adapted to be moved in one direction to drive the bilge hoops and at an angle to said driving direction to embrace and release a barrel.

10. In a machine of the class described, two independent hoop driving mechanisms, one of which is pivoted to move vertically and is adapted to drive the end hoops and the other of which has two angular arms pivoted to move horizontally toward each other to embrace a barrel and also adapted to slide vertically on the pivot to drive the bilge hoops.

11. In a machine of the class described, two independent hoop driving mechanisms, one of which is pivoted to move vertically and drives the end hoops, and the other of which is in parts pivoted to move horizontally toward or from each other to embrace or release a barrel and to move vertically to drive the bilge hoops, substantially as described.

12. In a machine of the class described, the combination with a hoop driving mechanism, of a stave compressing mechanism comprising two arms which are at least curved in part, segmental plates yieldingly attached to the curved parts and means for moving said arms to each other to clamp a barrel.

13. In a machine of the class described, the combination with a hoop driving mechanism, of a stave compressing mechanism comprising two arms which are at least curved in part and toggle means for moving said arms toward each other to clamp a barrel.

14. In a machine of the class described, the combination with a hoop driving mechanism, of a stave compressing mechanism comprising two arms which are in part straight and in part curved, a toggle mechanism connected to the straight part to move said arms toward each other to clamp a barrel and spring means for returning said arms to their spread position.

15. In a machine of the class described, the combination with a hoop driving mechanism, of a stave compressing mechanism comprising two arms which are at least curved in part, a yoke connected to an intermediate portion of each arm; said yokes being journaled on a common shaft and a toggle mechanism connecting the extremities of the arms.

16. In a machine of the class described, the combination with a vertical pivot, of a combined stave compressing and hoop driving mechanism comprising two pivoted arms which have portions thereof at least curved to completely surround an intermediate portion of a barrel between its ends, toggle means for pivotally moving said arms toward each other to embrace said intermediate portion of a barrel and means for vertically sliding said arms in unison on the pivot when embracing a barrel to drive a hoop upon said barrel.

17. In a machine of the class described, a hoop driving mechanism comprising two pivoted arms which have portions at least curved to completely surround an intermediate portion of a barrel between its ends, a system of levers for powerfully and comparatively rapidly moving both of said arms toward each other in a curved path to embrace said barrel intermediate its ends and means for moving said arms in unison in a straight path when embracing a barrel to drive a hoop upon said barrel.

18. In a machine of the class described, a hoop driving mechanism comprising two pivoted arms which have portions thereof at least curved to completely surround an intermediate portion of a barrel and are adapted to fit against the sides only of a barrel between its ends, a system of connected levers for powerfully and comparatively rapidly moving both of said arms on the pivots horizontally toward each other to embrace said barrel intermediate its ends and means for vertically sliding said arms in unison on the pivots when embracing a barrel to drive a hoop upon said barrel.

19. In a machine of the class described, the combination with a barrel head, setting mechanism, end hoop driving mechanism and bilge hoop driving mechanisms, of a barrel stave compressing mechanism adapted to clamp around a barrel between the end hoop driving mechanism and the bilge hoop driving mechanism.

20. In a machine of the class described, two independent hoop driving mechanisms, one of which is pivoted to move vertically and is adapted to operate against the ends of a barrel to drive the end hoops and the other of which has two angular arms pivoted to move horizontally toward each other to embrace the sides only of a barrel and also adapted to slide vertically on the pivot to drive the bilge hoops.

21. In a machine of the class described, a frame having a vertical bar, a hoop driving mechanism comprising a sleeve slidably mounted on said bar, two curved driving arms pivoted to the sleeve, a shaft journaled in the frame, a cranked connection between the sleeve and shaft and a spring mechanism between the connection and shaft whereby the hoop driving mechanism automatically stops when the driving pressure attains a predetermined point, substantially as set forth.

EDWIN F. BEUGLER.

Witnesses:
L. M. SANGSTER,
GEO. A. NEUBAUER.